(12) United States Patent
Kong

(10) Patent No.: US 8,485,132 B2
(45) Date of Patent: Jul. 16, 2013

(54) CONTAINER FOR TRANSPORTING LIVE FISH

(75) Inventor: Kyung Suk Kong, Busan (KR)

(73) Assignees: Daeil Co., Ltd., Busan (KR); Kyung Suk Kong, Busan (KR)

( * ) Notice: Subject to any disclaimer, the term of this patent is extended or adjusted under 35 U.S.C. 154(b) by 0 days.

(21) Appl. No.: 13/500,909

(22) PCT Filed: Oct. 7, 2010

(86) PCT No.: PCT/KR2010/006876
§ 371 (c)(1),
(2), (4) Date: Apr. 7, 2012

(87) PCT Pub. No.: WO2011/043614
PCT Pub. Date: Apr. 14, 2011

(65) Prior Publication Data
US 2012/0192798 A1   Aug. 2, 2012

(30) Foreign Application Priority Data
Oct. 7, 2009   (KR) .......................... 10-2009-0095369

(51) Int. Cl.
*A01K 61/00*   (2006.01)
(52) U.S. Cl.
USPC ......................................... 119/226; 119/223
(58) Field of Classification Search
USPC ................. 119/226, 227, 215, 224, 225, 223, 119/245, 248, 259, 260, 261; 210/150, 167.21, 210/167.22
See application file for complete search history.

(56) References Cited

U.S. PATENT DOCUMENTS

| 4,798,168 | A | * | 1/1989 | Vadseth et al. | 119/223 |
| 5,054,424 | A | * | 10/1991 | Sy | 119/260 |
| 5,078,867 | A | * | 1/1992 | Danner | 210/167.22 |
| 6,443,097 | B1 | * | 9/2002 | Zohar et al. | 119/217 |
| 6,641,718 | B2 | * | 11/2003 | Lari et al. | 210/124 |
| 6,641,732 | B1 | * | 11/2003 | Cheyne | 210/615 |
| 7,264,714 | B2 | * | 9/2007 | Joneid | 210/167.21 |
| 7,807,053 | B2 | * | 10/2010 | Smith | 210/167.22 |
| 7,918,995 | B2 | * | 4/2011 | Arita et al. | 210/167.22 |
| 8,006,645 | B2 | * | 8/2011 | Spartz | 119/223 |

FOREIGN PATENT DOCUMENTS

| JP | 05-176657 A | 7/1993 |
| JP | 06-296447 A | 10/1994 |
| JP | 2000-166422 A | 6/2000 |
| JP | 2008-178382 A | 8/2008 |
| KR | 20-1998-0067547 U | 12/1998 |
| KR | 10-0557805 B1 | 3/2006 |

\* cited by examiner

*Primary Examiner* — Yvonne Abbott
(74) *Attorney, Agent, or Firm* — Novick, Kim & Lee, PLLC; Jae Youn Kim

(57) ABSTRACT

The present invention relates to a container for transporting live fish, in which a protein skimmer is installed together with a fish tank in an interior of a cargo room of the container, bubbles discharged from the protein skimmer are stored in a large-capacity bubble tank, a water cooler having a refrigerating unit is installed in a container driver unit such that water discharged from the fish tank is cooled and resupplied to the fish tank, or water cooled by the water cooler can be brought into contact with the external air while the water is being injected into a dry filtering tank installed on the fish tank, and a filtering member impregnated with microorganisms that have been cultured therein is arranged in the dry filtering tank.

9 Claims, 11 Drawing Sheets

CONTAINER FOR TRANSPORTING LIVE FISH

TECHNICAL FIELD

The present invention relates generally to a live fish container for transporting live fish, which is capable of preventing diseases in or the death of live fish in advance due to the occurrence of poisonous substance to be generated during the decomposition process of floating matters and protein components by maximizing the purification performance of live fish water within the limited space of a cargo room, which enables the water in the fish tank to be cooled at a uniform temperature, and which is capable of variously controlling the temperature of the cooled water in accordance with the type of fish, such that the live fish stored in the fish tank can be kept fresh over a long period of time for transportation, and the time period of transporting live fish and the distance able to be covered by the live fish transporting container can be extended to the maximum.

BACKGROUND ART

Generally, containers to be used for importation/exportation goods may be classified into 20 feet-type and 40 feet-type. In the case of 20 feet-type, live load including the weight of container is not greater than 24 ton. In the case of 40 feet-type, live load including the weight of container is not greater than 30 ton. This fact is limited to the application of International Standard with respect to importation/exportation goods. Alternatively, containers to be used for importation/exportation goods may be classified into a dry container for transporting general goods, a ceiling open-type container for conveniently loading or unloading goods, and a freeze-type container for transporting frozen goods or cold-storage goods.

The freeze-type container generally employs a refrigerating unit for setting a desired cooling temperature with respect to loading goods. Accordingly this freeze-type container may be further classified into an internal-type container and an external-type container in accordance with installation of the refrigerating unit. Internal temperature of cargo room may be controlled in the range of +26° C.~28° C. due to the operation of refrigerating unit.

Meanwhile, it is required to have an electric power source for operating the refrigerating unit. For this purpose, an electric apparatus for applying and storing an electric source generated from a power source of a trailer or a container ship is also installed in the freezer container together with the refrigerating unit. Since it is necessary to have some special devices in the freezer container, the freezer container is loaded in a freezer container space defined within the container ship.

An electric device to be used for the freezer container as described above typically includes a unit control box having a power connector, and a thermometer. The unit control box controls an operation of the refrigerating unit including a compressor, an expansion valve, and a cooling fan and so on by receiving an electric power generated from a ship or a trailer electrically connected with a power connector, on the basis of a cooling temperature measured by using the thermometer.

The consumption of live fish has lately grown due to the increase of the consumers' desire according to the development in food service industry and a larger increase in national income. The output of live fish farmed and caught from the coastal waters is beyond the amount of consumption of home consumers preferring live fresh seafood. Since logistics costs for transporting live fish from a live fish producing district to the consumer is too high, purchase price of live fish is highly increased.

In the case of transporting live fish from the live fish producing district to the consumer under the room temperature condition, the percentage rate of live fish to seawater to be charged into a live fish container is 15%:85%. Since the number of live fish is high and it is hard to survive live fish by 24 hours in the course of transporting, the live fish may be transported for a relatively short distance. For transporting live fish over exceedingly long distances and from one country to another, logistics costs for transporting live fish is too high.

In view of the foregoing, a variety of endeavors for developing a live fish transporting container having advantages of the freezer container above have been proposed. It is important, therefore, that an improved live fish container can provide safe transportation of the young of fishes or aquarium fishes over long distances for a long time and can perform a large-scale transportation of live fish with a low logistic cost. This leads to the economical importation of live fish from a country with less consumption of live fish and leads to the prosperous exportation of the competitive domestic live fish.

For example, an improved container as described above generally comprises a live fish water tank and a wet-type filtering tank installed in an interior of a cargo room, and a driver unit disposed at a rear side of the cargo room. A refrigerating unit, that is an apparatus for cooling live fish, is installed in the driver unit. The improved container typically can make live fish stored in the live fish tank to be cooled at a certain standard temperature by using the apparatus for cooling live fish.

The apparatus for cooling live fish includes a compressor, a condenser having a cooling fan, an expansion valve and an evaporator. The compressor, the condenser and the expansion valve are installed as a refrigerating unit within a case for the driver unit. A refrigerant tube extending from the expansion valve to an interior of the cargo room is installed at a bottom surface or a side wall surface of the live fish tank as an evaporator. This evaporator is fluid-communicated with the compressor of the driver unit through the refrigerant tube.

If a refrigeration cycle is performed due to the operations of the compressor, the expansion valve and the evaporator under the state that the evaporator of the refrigerating unit is installed at the bottom surface or the side wall surface of the live fish tank or in the interior of the wet-type filtering tank, the temperature of live fish water stored in the live fish tank cools about 0° C. Due to this, it is possible to minimize the metabolic rate and the oxygen consumption rate of live fish. And incidentally, it is possible to transport live fish over short distances for a short time in a state that the water has a relatively low weight equivalent to four times with respect to the weight of live fish.

However, in the conventional apparatus for cooling live fish, long refrigerant pipes are disposed as a zigzag passageway at the bottom surface or the side wall surface of the live fish tank or in the interior of the wet-type filtering tank. Furthermore, the evaporator may be installed in the live fish tank or the wet-type filtering tank. The drawback of the conventional apparatus for cooling live fish is that a long time occurs to install or repair the apparatus, and thereby resulting in increased costs.

Typically, the live fish tank may be formed by using the laminating strategy with FRP (Fiber Reinforced Polymer) materials. In order to manufacture the live fish tank, the first step of the laminating process is performed and then the process for installing the evaporator is performed. Thereafter, the process for connecting the refrigerant pipes between the constitutional elements for the live fish tank is performed. Then, the second step of the laminating process is performed. Then, it must perform repeatedly these steps several times and thereafter it is forced to finish working. To conclude, the conventional process for manufacturing the conventional live fish tank is quite complicated and difficult to perform.

In the course of installing the live fish tank in the live fish container, the process for disposing and fixing the evaporator at the bottom surface or the side wall surface of the live fish tank is quite difficult to perform. In the meantime, the evaporator may comprise relatively expensive titanium having the corrosion resistance. Since long refrigerant pipes are disposed as a zigzag passageway at the bottom surface or the side wall surface of the live fish tank or in the interior of the wet-type filtering tank, this leads to the dissipation of resources and to the increase of costs.

Meanwhile, when live fishes are loaded or unloaded in the course of transporting live fishes by using a trailer, they are likely to be damaged by the surface of the evaporator protruding toward the live fish tank due to the vibration or the shock to be applied to the live fish container. If the live fish receives a wound, it gets diseased and thereby value of commodities for the live fish deteriorates. Furthermore, since the surrounding temperature of the refrigerant tube for the evaporator is too lower than the temperature of live fish, the live fish is likely to get diseased or to die by getting stressed.

Meanwhile, there is a possibility that great quantities of scales are formed along the surface of the refrigerant pipe for the evaporator. This leads to the contamination of the live fish. Also, this leads to the decline of the heat exchanging effectiveness and the refrigerating performance. Therefore, it is difficult to reduce the temperature of live fish in the course of transporting live fish. As a result, it is hard to transport live fish over long distances for a long time in a state that the live fishes contained in the live fish container are maintained with ensuring the safety and the security thereof.

Meanwhile, in the conventional apparatus for cooling live fish, the refrigerant pipes extend up to the evaporator installed in the live fish tank of the driver unit. In order to prevent the refrigerant pipes from being corroded by live fish water, that is seawater, it must to perform a waterproof sealing process for refrigerant pipes by using specific lagging materials. This leads to increased costs in the manufacturing process of the apparatus for refrigerating live fish. Since there are many welded portions and connected portions between refrigerant pipes, the refrigerants are likely to be leaked there through due to the shock and the vibration applied to the live fish container during the process of loading or unloading live fishes or during the transportation of the live fish container by using a trailer. If the refrigerants are leaked through the welded portions and the connected portions between refrigerant pipes, live fishes may be died en masse. Since the welded portions and the connected portions between refrigerant pipes exist in great numbers, it is difficult to completely check the leakage of the refrigerants and it is hard to repair the damaged refrigerant pipes.

Meanwhile, the wet-type filtering tank installed in the live fish container generally includes filter media such as sand, gravel, non-woven fabric or sponge and so on by laminating them on a bottom of the live fish tank; and a filtering tank including filter media as such, which is installed at the outside of the live fish tank. The water may be filtered and purified by bacteria cultured in the filter media by making it flow through the filter media.

Furthermore, it was well that functional filling materials such as red clay or elvan (germanium) may be applied to the wet-type filter media so as to enhance the germicidal power and the sterilizing power of the wet-type filter media. Alternatively, some filling materials such as an activated carbon (charcoal) having an excellent adsorptive power can be applied to the wet-type filter media. Alternatively, some researchers attempt to illuminate ultraviolet rays to the live fish water in order to enhance the performance for purifying the live fish water.

Since a large number of live fishes are stored at high density in the live fish tank of the live fish container, it is difficult to effectively remove fine contaminants or protein components from the live fish water. Typically, a worker reduces the temperature of the live fish water so as to minimize the metabolism rate and the oxygen consuming rate. Since a variety of harmful ingredients resulted from live fish excrement, more particularly, ammoniac nitrogen components may be rapidly accumulated in the live fish at a high concentration, it is hard to effectively remove the harmful ingredients by only using the conventional wet-type filter media.

If the wet-type filter media is independently used in the live fish container, the filter media must be deposited in the live fish water or additional large filtering tank must be installed. In this case, the total weight of the live fish filtering tank including the filter media is too great, thereby resulting in the excessive weight of the live fish container. In other words, the excessive weight over the limit weights of 24 ton in the feet container or of 30 ton in the 40 feet container may be occurred, so that it is likely to break the rules with respect to the weight restrictions of live container.

In order to fulfill the rules with respect to the weight restrictions of live container, it is necessary to reduce the total size of live fish container including the filter media. This leads to the reduction in the quantity of live fish to be transported by using the live fish container at once. Accordingly, it is hard to reduce the logistical cost with respect to the transportation of live fish.

In the use of the conventional wet-type filter media, the live fish water may be circulated due to the operation of the circulation pump in a state that the filter media is immersed in the live fish water. As a result, the filtering efficiency is relatively low so that it is necessary to increase the volume occupied by the filter media so as to obtain a sufficient filtering capability. This leads to a remarkable reduction in the space for storing live fish.

As well known that, the ammoniac nitrogen components may be presented as two types of chemical formula such as $NH_3$—N, $NH_4^+$—N which are combined with $NH_3$ or $NH_4^+$, respectively. The ammoniac nitrogen components produced by combining with the nonionic ammonia can pass through a cell-wall of fish and can damage the live fish under even low concentration such as 2 mg/L or 2 ppm. Furthermore, the ammoniac nitrogen components may oxidize to the nitrate nitrogen or the nitrite nitrogen and they exhaust the dissolved oxygen in the water.

According to the rules of the U.S. Environmental Protection Agency, the content of the harmful ingredients such as ammoniac nitrogen must be removed below 0.002 mg/L so as to store the live fish with safe and fresh condition. However, it is impossible to remove these harmful ingredients by only using the wet-type filtering tank having a relatively poor filtering capability. If a transportation time of live fish by using a live fish container becomes long, the live fish is likely to be getting a certain disease due to the harmful ingredients accumulated in the live fish, thereby resulting in the death of live fish.

Consequently, the time limit for transporting live fish by using the conventional live fish container is only two days at maximum. Accordingly, the conventional live fish container is unsuitable for transportation live fish over a long distance for a long time and therefore it is only used for transportation over a short distance for a short time. As a result, a large number of live fish must be transported not on the sea and the land but on the air. This has resulted in high cost of transporting live fish and thereby it has poor productivity.

In the conventional live fish container, pumping means for circulating and purifying live fish water through the wet-type filter media are installed in the cargo room of the live fish container. Additionally, a live fish sterilizer, an oxygen supplying device and a lighting installation may be installed in the cargo room of the live fish container. Furthermore, a control part comprising a control panel, a battery and an inverter may be installed in the cargo room of the live fish container.

The control panel to be installed in the cargo room of the live fish container can function to control the operation of the live fish container together with the unit control box of the driver unit. The inverter can function to switch the electric power so as to allow the live fish container to be operated by receiving the electric power from the battery while an outer electric source is not applied to the live fish container.

If a worker uses the live fish container to be operated as described above, he or she must reduce the temperature of live fish water to a predetermined temperature at which the live fish goes to hibernation so as to survive live fishes during the transporting time period of live fish. Also, the worker makes the interior and the outside of the live fish container to be completely sealed so as to prevent the chill from being leaked.

If the moisture of the live fish water stored in the live fish water tank is accumulated in the cargo room, the internal air of the cargo room has a very high humidity. Since seawater is typically used as the live fish water, the salt concentration contained in the internal air of the cargo room and the moisture is also high.

One drawback of this conventional live fish container is that the control panel, the battery and the inverter of the control part are likely to be easily corroded or damaged due to the internal moisture of the cargo room and thereby resulting in the breakdown or the malfunction of the control part. Accordingly, there are many problems in the safe transportation of live fish by using the live fish container.

In order to solve the problem as described above, electronic control components, the battery and the inverter of the control panel must be inserted into the sealing-type case so as to prevent them from contacting with the internal air. Since it is difficult to effectively cool the heat to be generated during the operations of the electronic control components, the battery and the inverter, the breakdown or the multifunction may be occurred due to the overheating of the control part.

Since a person cannot enter into the cargo room during the transporting of the live fish in the live fish container, it is necessary to perform a manless operation for a long time. However, the control part installed in the cargo room is likely to be corroded or to be overheated so that it may be breakdown and a fire may be broken out. As a result, live fishes may be died en masse during the transportation of live fish. Furthermore, repair and maintenance costs for the control part are excessive.

DETAILED DESCRIPTION OF THE INVENTION

Accordingly, the present invention has been made to solve the above-mentioned problems occurring in the prior art, and a first object of the present invention is to provide a live fish container for transporting live fish, in which a protein skimmer is installed together with a fish tank in an interior of a cargo room of the container, bubbles discharged from the protein skimmer are stored in a large-capacity bubble tank, a water cooler having a refrigerating unit is installed in a container driver unit such that water discharged from the fish tank is cooled and resupplied to the fish tank, or water cooled by the water cooler can be brought into contact with the external air while the water is being injected into a dry filtering tank installed on the fish tank, and a filtering member impregnated with microorganisms that have been cultured therein is arranged in the dry filtering tank. Thus, contaminants can be collectively removed by the protein skimmer and the dry filtering tank, and water-purifying capability within the limited space of the cargo room is maximized, thereby preventing diseases in or the death of live fish in advance, enabling the water in the fish tank to be cooled at a uniform temperature, and variously controlling the temperature of the cooled water in accordance with the type of fish, such that the live fish stored in the fish tank can be kept fresh over a long period of time for transportation, and the time period of transporting live fish and the distance able to be covered by the live fish transporting container can be extended to the maximum.

Furthermore, a second object of the present invention is to provide a live fish container for transporting live fish, which is capable of further enhancing the purification performance of the live fish water without reference to the weight limits for the live fish container, which is capable of increasing the carrying capacity of live fish by obtaining a sufficiently large space to be occupied by the live fish water tank within the space of a limited cargo room, which is capable of securing a sufficient dissolved oxygen during the supply of live fish water from the injection nozzle through the filter media to the live fish water tank under the state that a great quantity of microorganisms for removing harmful ingredients are impregnated and then cultivated in the filter media of the dry filtering apparatus, and whereby the water quality of the live fish water becomes increasingly improved near that of raw water, which is capable of enabling a foreign trader to export the live fish to or import from a far-away country by ship or train and also to transport the live fish to distance lands by automobile, and whereby the live fish can be transported over a long distance for a long time at low logistics costs by preventing the live fish from getting a disease or being died so as to reduce the time of transporting the live fish and to secure a transporting distance at maximum, by installing the dry filtering tank having the dry filter media at the upper side of the live fish tank and by installing the live fish injection tube extending through the water cooler and the air supply tube connected with the air blower of the driver unit at the upper side of the dry filter media.

Furthermore, a third object of the present invention is to provide a live fish container which is capable of securing a sufficient dissolved oxygen required for inducing the reaction of microorganisms and for helping the growth of the live fish without having any additional oxygen supplying device such as a bubble generator, by extending the pressure tube having the pressure pump from the wet-type filtering tanks and by connecting this pressure tube with the water injection tube, and by minimizing the bubble's size of live fish water injected from the injection nozzle of the water injection tube so as to maximize contact area with air.

Furthermore, a fourth object of the present invention is to provide a live fish container which is capable of allowing a worker to enter a working space through an auxiliary door installed at the side surface of the cargo room so as to load and unload the live fish with ease, by installing the wet-type filtering tanks at the outside of the live fish tank, by providing a space for loading the live fish at the side surface of the live fish tank or between the live fish tanks due to the adjustment of the size of the wet-type filtering tank, which can significantly reduce the cost and time spent for the transportation of the live fish, and which can prevent live fish from being damaged during the transportation of the live fish.

Finally, a fifth object of the present invention is to provide a live fish container which is capable of preventing the control part from being corroded and damaged due to the existence of moisture containing a large quantity of salt components in the cargo room, which is capable of preventing the control part from malfunctioning due to the overheating of the control part and of preventing a fire from broken out due to the overheating of the control part by effectively refrigerating the control part, which is capable of securing a correct operation of the live fish container and of securing a safe transportation of the live fish, and whereby the live fish can be transported over a long distance for a long time at low logistics costs, by providing a circulation passageway for an external air on the control part, which is defined by a supply tube, an exhaust tube and a plurality of connecting tubes, under the state that various control means installed in the cargo room are inserted into a sealing type case.

To accomplish the foregoing objects, the present invention provides a live fish container including a cargo room of the type in which a driver unit is installed at a rear side of the cargo room in such a manner that it may be integrally formed with a container main body or may be separatably assembled with the container main body, a control part, a plurality of live fish water tanks and a plurality of wet-type filtering tanks, which are installed in the cargo room, and a water cooling apparatus installed at the driver unit as a refrigerating unit, which includes a compressor, a condenser and an expansion valve, wherein the improvement comprises:

a protein skimmer and a bubble tank are installed in an interior of the cargo room, a water cooler for cooling live fish water by virtue of heat exchange with refrigerants is installed in the driver unit and an air blower for introducing external air is installed in the driver unit;

a water exhaust tube extending from the live fish water tanks is fluid-communicated with the protein skimmer and a water supply tube extending from the protein skimmer is fluid-communicated with the live fish water tanks, in which a pump is disposed at a middle portion of the water exhaust tube;

a bubble outlet is formed at an upper end of the protein skimmer and it is fluid-communicated with the bubble tank via a guide channel, a nozzle is formed at the water exhaust tube at a position between the protein skimmer and the pump, in which an air supply tube is fluid-communicated with the nozzle;

the water cooler is formed as a double tube-type heat exchanger such that a water cooling tube is longitudinally inserted into a refrigerant tube, in which the water cooling tube is fluid-communicated with a water exhaust tube having a circulation pump and extending from wet-type filtering tanks, and a water supply tube extending from the water cooling tube is fluid-communicated with the live fish water tanks in the cargo room;

an air supply tube is installed in the interior of the cargo room such that one end thereof is fluid-communicated with the air blower of the driver unit; and an exhaust pipe may be formed through a main door or a wall (W) of the container main body.

According to the present invention, a dry filtering tank is installed at a one upper side in an interior of the live fish water tank within the cargo room. The water supply tube extending from the water cooler to the interior of the cargo room is fluid-communicated with a water injection tube 16 having a plurality of water injection nozzles, in which the water injection tube is installed above the level of the dry filtering members and extends along the longitudinal direction of the dry filtering members. The dry filtering member comprises a porous pellet filter disposed at an inner lower side of the filtering tank cover and porous fiber filters disposed above the level of the pellet filter within the filtering tank cover, in which the fiber filter and the pellet filters are impregnated with microorganisms that have been cultured therein so as to purify live fish water.

According to the present invention, a one end of a pressure tube extending from the wet-type filtering tanks is fluid-communicated with the other end of the water injection tube, in which a press pump is disposed at a middle portion of the pressure tube between the wet-type filtering tanks and the water injection tube. A drain is formed at a lower side of the filtering tank cover of the dry filtering tank, a plurality of water flowing holes for introducing live fish water after passing through the dry filter member into the live fish water tanks are formed at a one upper side surface of the live fish water tanks at regular intervals. A wash board is provided at the upper side of the live fish water tank so as to prevent the live fish water from flowing over.

According to the present invention, the wet-type filtering tanks are installed at the outside of the live fish water tanks, a working space for loading and unloading live fish is provided at a position adjacent to the live fish water tanks, an auxiliary door for allowing a worker to enter is installed at the wall (W) of the container main body at a position adjacent to the working space, and a drain pipe extends from the lower end of the live fish water tank at a bottom side of the working space, in which a drain valve is installed at a middle portion of the drain pipe. An auxiliary circulation pump is installed at a bottom surface of the live fish container at a position in the working space, an auxiliary circulation pipe for circulating live fish water from the wet-type filtering tanks toward the interior of the live fish water tanks is fluid-communicated with the auxiliary circulation pump, a nozzle is formed at a middle portion of the auxiliary circulation pipe extending from the auxiliary circulation pump toward the live fish water tanks, and an air supply tube is fluid-communicated with the nozzle.

According to the present invention, the control part comprises a plurality of control panels, an inverter and a battery, in which electronic control means of the control panel are inserted into an enclosed type panel case, the inverter and the battery are inserted into an enclosed type battery case, wherein an air supply pipe extends from the main door or the wall (W) of the container main body to the control panel, an air discharge pipe extends from one of the control panel to the main door or the wall (W) of the container main body, and a plurality of connecting tubes extend between the panel cases and the battery case or between the panel cases, whereby it may provide a circulation passage for external air, and wherein an air blower 61 may be installed at the air supply pipe, the air discharge pipe or an interior of the panel case. The air supply pipe, the air discharge pipe and the connecting tubes extend between corners of the panel cases and the battery case so as to create an air stream to flow in a diagonal direction at interiors of the panel cases and the battery case.

As described above, the live fish container according to the present invention can remove floating matters, protein component, ammonia and nitrogen components contained in the live fish water, which cannot be forcibly removed by only using the conventional wet-type filter media, due to the use of the protein skimmer. Since the floating materials and the protein components are not accumulated and corroded in the wet-type filter media, it can further enhance the purification performance and disease or death of the live fish can prevented in advance.

Since oxygen existing in the air is brought into contact with a strong whirlpool created by a large quantity of fine air bubble having a micron size and the live fish during the operation of the protein skimmer, it can be easily dissolved in the live fish water. As a result, it is possible to increase the dissolved oxygen of the live fish water. Furthermore, it can remove bad smell generated from the live fish water or the live fish by forcibly moving up and removing various noxious gases such as ammonia and bad smell dissolved in the live fish water with the aid of fine air bubbles having the micron size.

Since the floating matters, waste and protein are forcibly separated and removed from the live fish water within the protein skimmer and thereafter they are stored in the bubble tank, the load for filtering the live fish water by using the filter media can be highly reduced. Due to this, it is possible to obtain a sufficient purification performance by using a filtering tank having a small space. Accordingly, it can obtain further wide storage space for the live fish and the live fish water within the live fish container.

Since the water cooler for refrigerating the live fish water due to the heat exchange with the refrigerants is installed at the driver unit of the live fish container, it is possible to uniformly cool the live fish water at a desired cooling temperature without installing the evaporator at the refrigerant tube. Therefore, this leads to the minimization of a time period that the live fish container is placed in out of service. Also, this leads to the maximization of the economic feasibility and the convenience in the use of the live fish container.

Since there is no additional piping structure within the live fish tank, it is possible to prevent the body of ship from being damaged by the refrigerant tube protruding to the live fish tank. Also, it can prevent the live fish water from being secondarily contaminated due to the formation of scales within the pipe for circulating the refrigerant and thereby this leads to cleaning convenience. And incidentally, it is possible to transport live fish over short distances for a short time in a state that the live fishes contained in the live fish container are maintained with ensuring the safety and the security thereof.

Since the refrigerant tube does not extend between the driver unit and the live fish tanks, it is not necessary for performing a specific insulation process and a waterproof sealing process to the refrigerant tube. This leads to substantial reduction the cost of equipment for installing the water cooler. Because the water cooler is formed as a double tube-type heat exchanger, it is possible to minimize the volume required for installing the water cooler and to enhance the cooling performance of live fish. Since the refrigerant is not leaked to the live fish water, it allows a worker to easily ascertain and repair a portion related to the leak of refrigerant.

As all of the refrigerant units including the water cooler are integrated within the driver unit, the drive unit may be manufactured separately from the cargo room and it can be easily combined to or separated from the cargo room. Accordingly, a general cargo container can be simply used as the live fish container and it is possible to accomplish a systemed manufacturing process for the purpose of mass production of the live fish container. When the refrigerant unit is broken out or functions wrongly, it is possible to repair or replace the refrigerant unit on the spot without discharging live fishes or live fish water from the live fish container in advance. Therefore, this leads to the minimization of a time period that the live fish container is placed in out of service. Also, this leads to the maximization of the economic feasibility and the convenience in the use of the live fish container.

In the case of installing the dry filtering tanks at the interior of the cargo room of the live fish container together with the protein skimmer and the water cooler, it can make the live fish water injected from the injection nozzle flow along the filter media exposed to the air such that it does not affect the loading capacity of the live fish container. This leads to the maximization of the purifying performance with respect to the live fish water.

Due to this, it is possible to highly increase the quantity of live fishes which are carriable by the trailer at once. And incidentally, it is possible to heap up a large number of filter media at the outside of the live fish tanks without worrying about the increase of loading weight. Furthermore, various noxious gases such as ammoniac nitrogen contained in the live fish water can be almost completely removed by a large number of microorganisms presented in the filter media. And incidentally, it is possible to transport live fish over short distances for a short time in a state that the live fishes contained in the live fish container are maintained with ensuring the safety and the security thereof.

Due to these advantages, it enables a foreign trader to export the live fish to or import from a far-away country by ship or train and also to transport the live fish to distance lands by automobile, and whereby the live fish can be transported over a long distance for a long time at low logistics costs and an end consumer can buy a high quality of live fish at a low cost.

As the air supply tubes are installed in the live fish container together with the air injection tubes, a sufficient quantity of dissolved oxygen required for inducing the reaction of microorganisms and for helping the growth of the live fish can be provided. Since air within the cargo room can be smoothly circulated due to the introduction of outer fresh air via the blower, it can provide microorganisms with cheerful surroundings to live. Furthermore, it can remove bad smell generated from the live fish water or the live fish by forcibly moving up and removing various noxious gases and bad smell dissolved in the live fish water. Accordingly, it is possible to prevent the live fish water from being re-contaminated by bad smell. This leads to the creation of a pleasant environment to live within the cargo room before unloading of the live fish.

According to the present invention, a working space for loading and unloading live fish is provided between the live fish water tanks or at the outside of the live fish water tanks. Furthermore, live fish loading means and auxiliary means for circulating the live fish are installed in the working space. Due to this structure, it is possible to maximize the purification performance of the live fish water and the capacity for supplying oxygen. And incidentally, it makes a worker to easily load the live fishes to the interior of the live fish water tanks or unload the live fishes there from with the aid of means for loading and unloading the live fish. Therefore, it is possible to reduce the expenses required for loading and unloading live fishes at maximum by minimizing the time and the cost of labor during loading and unloading process of live fishes.

Since the apparatus for cooling the control part is installed in the cargo room, it is possible to prevent the control part from being corroded and damaged due to the existence of moisture containing a large quantity of salt components in the cargo room. Furthermore, the control part can be further effectively cooled by the external air so that it is possible to secure, and thereby resulting in a safe transportation of the live fish.

Furthermore, according to the present invention, it is possible to prevent a fire from broken out due to the overheating of the control part by effectively refrigerating the control part. Also, it is possible to reduce the expenses consumed for repairing the control part at the maximum. Since the live fish can be transported over a long distance for a long time by using the live fish container ship according to the present invention, it is possible to reduce the cost and time spent for the transportation of the live fish.

BRIEF DESCRIPTION OF THE DRAWINGS

The above object and other characteristics and advantages of the present invention will become more apparent by describing in detail preferred embodiments thereof with reference to the attached drawings, in which.

BEST MODE FOR CARRYING OUT THE INVENTION

Figure 1:
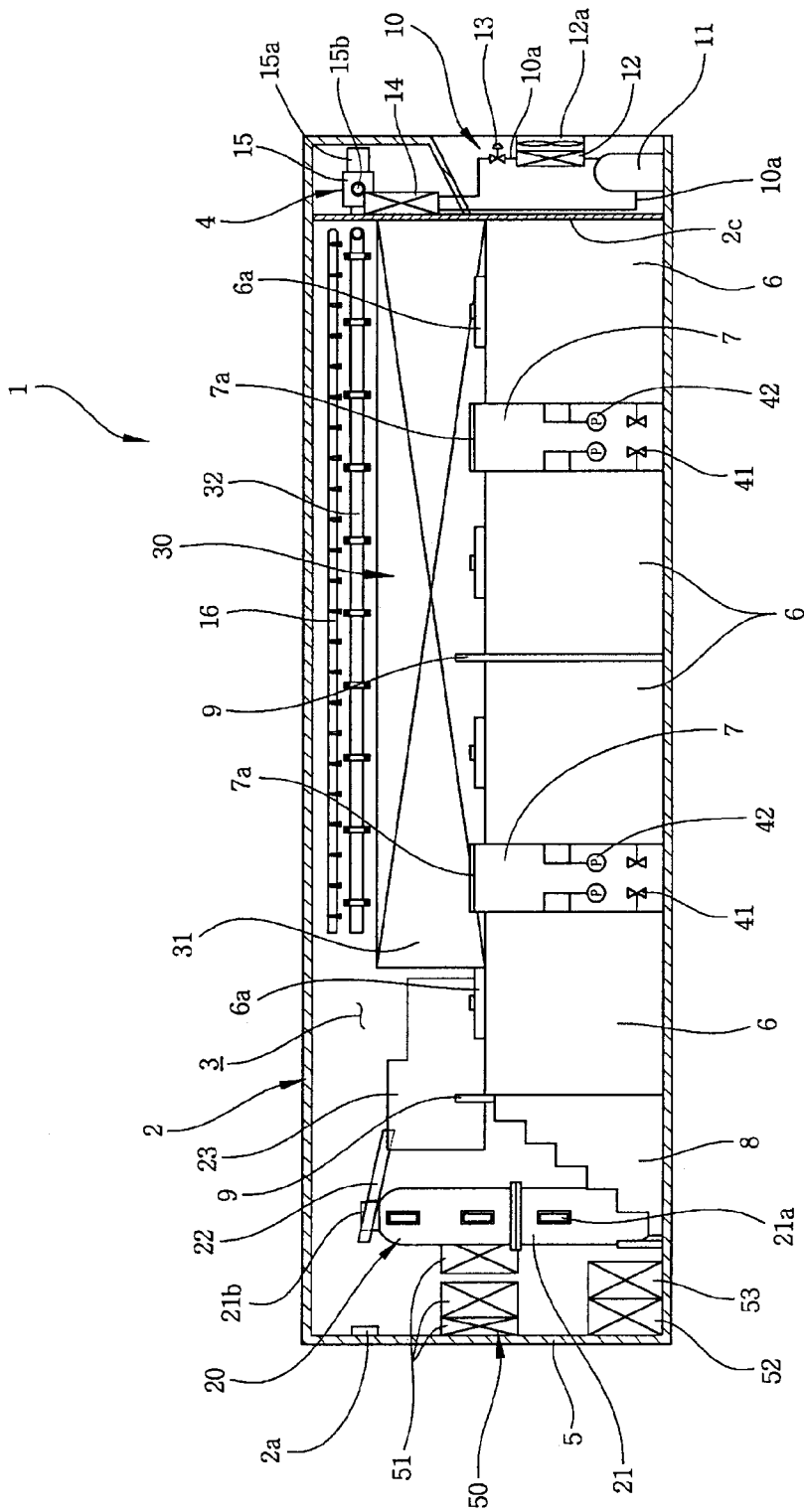
FIG. 1 is a side sectional view of a live fish container according to the present invention, for showing an internal structure of the live fish container.

Hereinafter, the constitution and the operation of live fish container according to the present invention will be explained in more detail with reference to the accompanying drawings. To maintain brevity, pipe lines for circulating live fish water are not illustrated in FIGS. 1 and 2. Prior to proceeding to the more detailed description of the preferred embodiment according to the present invention, it should be noted that, for the sake of clarity and understanding of the invention identical components which have identical functions have been identified with identical reference numerals throughout the different views which are illustrated in each of the attached drawing Figures.

Figure 2:
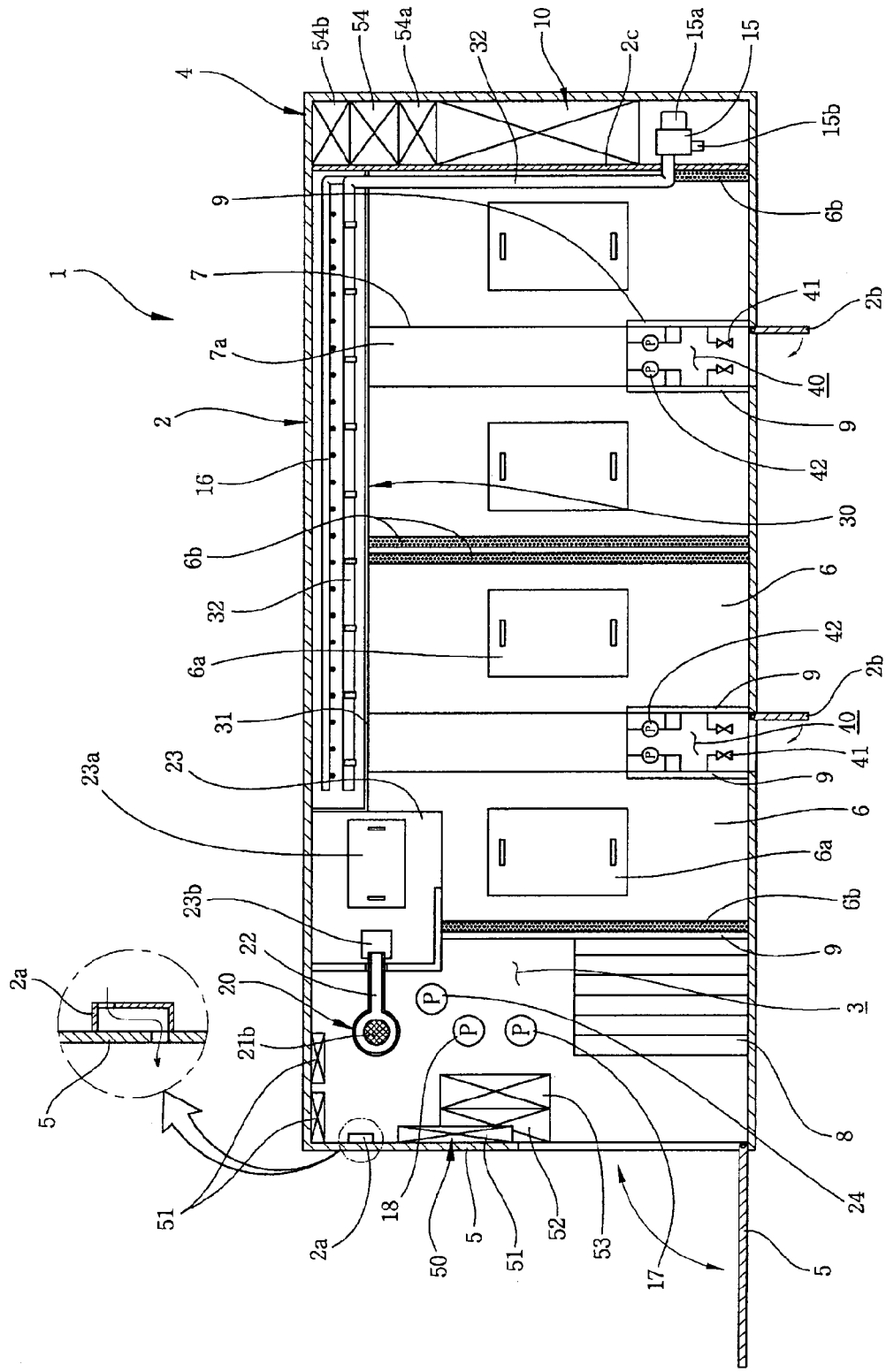
FIG. 2 is a plan and sectional view of the live fish container according to the present invention, for showing the internal structure of the live fish container.

FIGS. 1 and 2 show the total constitution of a live fish container 1 according to the present invention. A main door 5 is installed at a front side (=left side in FIGS. 1 and 2) of a main body 2. A cargo room 3 which functions as a cargo bay, is provided at a position adjacent to the main door 5 within the main body 2. A driver unit 4 for operating the live fish container 1 is installed in a space adjacent to a rear side of the main body 2, which is defined by the cargo room 3 and a partition wall 2c.

A plurality of live fish water tanks 6 and a plurality of wet-type filtering tanks 7 are alternately disposed within the cargo room 3. A plurality of pumps 17,18,24 and a control part 50 for operating them are installed at an inner front side of the cargo room 3. The control part 50 includes a control panel 51, an inverter and a battery 53. There are stairs for allowing a worker to access to the live fish water tanks 6 at the inner front side of the cargo room 3.

A thermometer 54b and a unit control box 54 having a power connector 54a are installed in the driver unit 4 together with a water cooling apparatus 10 which is a refrigerating unit. The unit control box 54 controls operating of the cooling apparatus 10 having a compressor, an expansion valve and a cooling fan, and the pumps 17,18,24 on the basis of a temperature measured by the thermometer 54b.

Meanwhile, the inverter 52 installed in the cargo room 3 makes the live fish container 1 to be operated by receiving an electric power generated from the battery 53 while an outer electric power is not transmitted through the power connector 54a to the live fish container 1. It is to be understood that any additional battery can be installed at the unit control box 54. These electric and electronic devices are well known to those skilled in the technical field pertained to the cooling container.

Although it was shown that four live fish water tanks 6 are installed within the cargo room 3 and one wet-type filtering tanks 7 is disposed between two live fish water tanks 6, it may be apparent to one of ordinary skill in the art that the numbers and the spatial layout of the live fish water tanks 6 and the wet-type filtering tanks 7 are not limited to the particular embodiment disclosed in the attached drawings. As such, those skilled in the art will appreciate that the numbers and the spatial layout of the live fish water tanks 6 and the wet-type filtering tanks 7 can be adjusted in accordance with the size of container (20 feet or 40 feet), the kind and the carrying capacity of the live fish.

Additionally, it should be appreciated by one of ordinary skill that the spatial layout of the wet-type filtering tanks 7 may vary based on application. For example, the wet-type filtering tanks 7 can be installed at the outside of the live fish water tanks 6. Alternatively, the wet-type filtering tanks 7 can be installed on a bottom surface of the live fish water tanks 6 by laminating filter media such as sand, gravel, non-woven fabric or sponge thereon. Alternatively, it is possible to employ only a dry filtering apparatus 20 according to the present invention, without having the wet-type filtering tanks 7.

A water tank cover 6a is disposed at an upper portion of the live fish water tank 6 and a filtering tank cover 7a is disposed at an upper portion of the wet-type filtering tank 7.

It is preferred that an oxygen generator (not shown) such as a bubble generator is installed at an inner bottom surface of the live fish water tanks 6. Also, it is preferred that lighting fixtures are installed at an inner side wall of the cargo room 3. It should be appreciated by one of ordinary skill that a variety of electric and electronic devices required for operating the live fish container 1 may be additionally installed in the live fish container 1 based on application. The control part 50 of the cargo room 3 and the unit control box 54 of the driver unit may control operations of those electric and electronic devices.

The essential of the live fish container 1 according to the present invention is the fact that a protein skimmer 20 is installed in the cargo room 3 of the live fish container 1. The protein skimmer 20 can function to collect and remove floating matters, proteins and various noxious gases contained in the live fish water by using fine bubbles with micron size.

Herein below, the structure and operation of the protein skimmer 20 will be explained in detail with reference to FIGS. 1 to 3.

The protein skimmer 20 is fluid-communicated with the live fish water tanks 6 via a water supply tube 24a and a water exhaust tube 24b extending there between, thereby resulting in the formation of the circulating path of the live fish water as the type of circulating loop between the protein skimmer 20 and the live fish water tanks 6. A pump 24 for circulating live fish water is installed at a middle portion of the water supply tube 24a. A nozzle 25 is installed at a position between the protein skimmer 20 and the pump 24. An air supply tube 25a is fluid-communicated with the nozzle 25.

If live fish water flowing through the live fish water supply tube 24a due to the operation of the pump 24 is injected by the nozzle 25 at a high speed, air to be introduced into the cargo room 3 via the air supply tube 25a may be mixed into live fish water.

The air mixed into the live fish water via the air supply tube 25a may be presented as the type of fine bubbles with micron size during the injection of live fish water into the protein skimmer 20. These fine bubbles may get together and may be changed at the type of small foam while they go up within a strong turbulence. At this time, floating matters, proteins and various noxious gases contained in the live fish water may be collected and then removed by means of fine bubbles with micron size. It should be appreciated by one of ordinary skill that a part of air may be dissolved in live fish water and then it can function to increase the dissolved oxygen of live fish water.

Consequently, it is possible to supply live fish water with a great amount of oxygen due to the operation of protein skimmer 20. Since live fishes may be stored in the live fish container 1 which is maintained at a low temperature, oxygen demand of live fish is very small. Accordingly, it can properly maintain the dissolved oxygen required for keeping live fishes by only installing the protein skimmer 20.

In view of the foregoing, it is possible to perform an oxygen supplying function by only using the protein skimmer 20 without having any oxygen supplying device in the light of quantity, transporting distance and time of live fishes to be stored in the live fish water tanks 6. If it is necessary, any additional oxygen supply device can be installed in the live fish container 1.

Meanwhile, an opening and shutting valve is installed at the water supply tube 24a and the air supply tube 25a, respectively. These opening and shutting valves are always opened during the normal operation of the protein skimmer 20. It is possible to control the flow of live fish water and the introduction of air by controlling the operation of the pump 24 for skimmer. Accordingly, it should be appreciated by one of ordinary skill, that the opening and shutting valves can be omitted based on application.

A bubble outlet 21b is formed at an upper end of the protein skimmer 20 and it is fluid-communicated with a bubble tank 23 via a guide channel 22 having a substantially U-shaped section.

The guide channel 22 is downwardly slanted toward the bubble tank 23 so as to smoothly induce bubbles discharged from the protein skimmer 20. It should be appreciated by one of ordinary skill, that the method for inducing bubbles exhausted from the protein skimmer 20 is not limited as shown in the attached drawings and it may vary based on application with considering the position of the bubble tank 23.

Preferably, the bubble tank 23 may be formed as a large-capacity vessel so as to safely store bubbles. Due to this, no floating matters and protein bubbles discharged from the protein skimmer 20 are leaking to the outside during the transporting period by using the live fish container 1. An opening 23b is formed at an upper surface of the bubble tank 23 such that one end of the guide channel 22 can be inserted into the bubble tank there through so as to induce bubbles discharged from the protein skimmer 20.

A cover 23a is installed at an upper portion of the bubble tank 23 in such a manner that wastewater contained in the bubble tank 23 can be discharged to the outside through the cover 23a. Alternatively, since wastewater contained in the bubble tank 23 can be discharged to the outside through the opening 23b, the cover 23a can be omitted.

Since the bubble tank 23 formed as the large-capacity vessel must be installed at the interior of the cargo room 3, it is preferred that the bubble tank 23 is disposed above the level of the live fish water tank 6. An empty space may be provided in the upper portion of the live fish water tank 6 such that a worker can move there through so as to load or unload live fishes. If the bubble tank 23 is installed in this empty space, there is no restriction for installing any equipment including the live fish water tank 6.

It may safely be said that, with respect to the protein skimmer 20 to be applied to the present invention, any sort of product will do as long as it can collect and remove a variety of harmful ingredients such as floating matters, protein components, ammonia or nitrogen gases which are contained in the live fish water while the live fish water introduced through the water exhaust tube 24a together with air may be circulated in the form of a whirlpool. It is preferred that any product to be used as the protein skimmer 20 has a simple structure and an excellent skimming effect.

Figure 3:
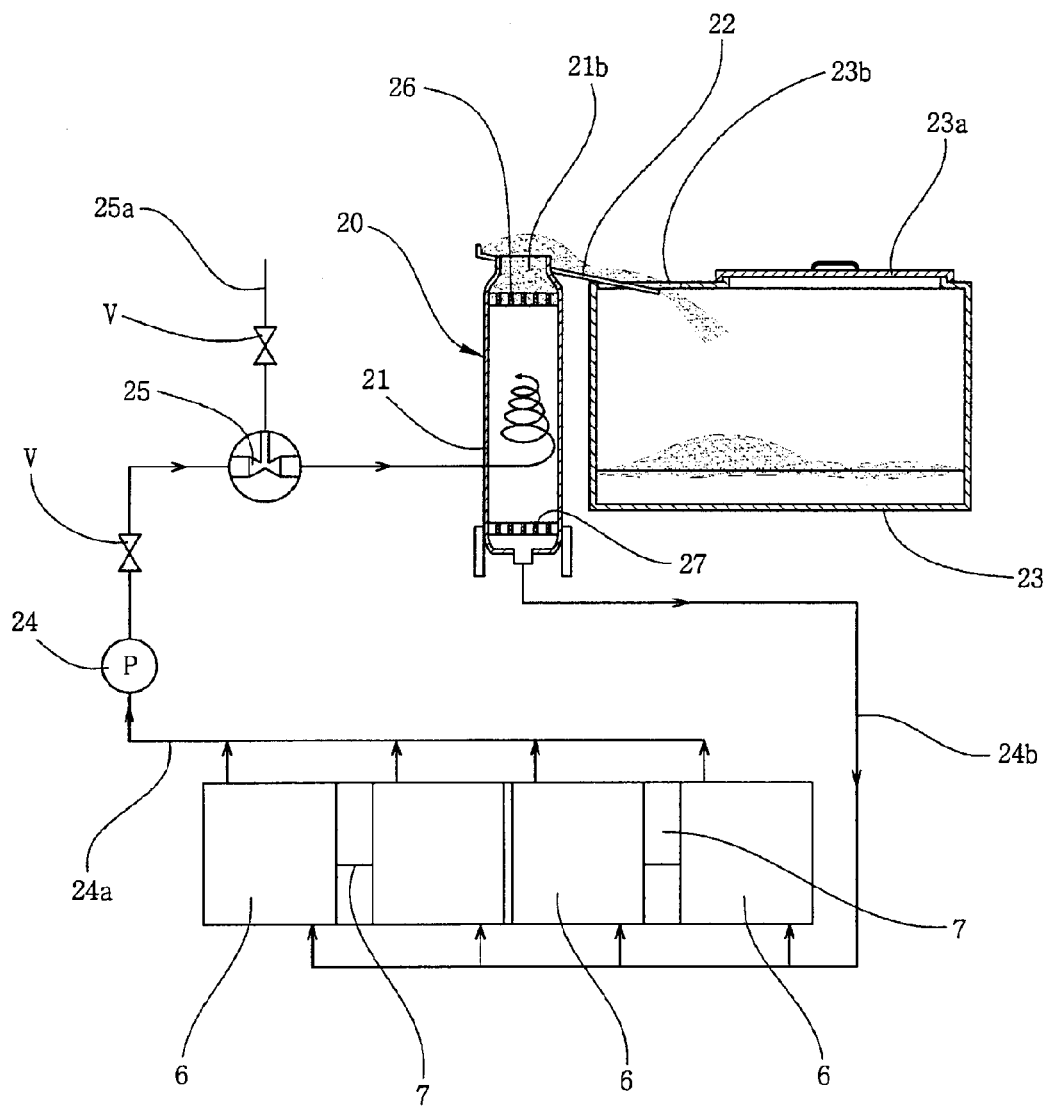
FIG. 3 shows a piping structure for circulating live fish water, for showing important parts of the live fish container in detail in the section surrounding the protein skimmer.

A fairly typical case thereof is shown in FIGS. 1 and 3. Referring to FIGS. 1 and 3, the protein skimmer 20 comprises a cylindrical main body 21 having a viewing glass window 21a, an upper frame 26 installed at an inner upper portion of the main body 21, a lower frame 26 installed at an inner lower portion of the main body 21, and a bubble outlet 21b formed at an upper end of the upper frame 26.

Preferably, when the protein skimmer 20 as described above is applied to the live fish container 1 according to the present invention, the water exhaust tube 24a is fluid-communicated with a lower side surface of the main body 21 in a tangential line form so as to increase the effectiveness of whirlpools. It is preferred that one end of a water supply tube 24b is fluid-communicated with a bottom side of the main body 21 and the other end of the water supply tube 24b is fluid-communicated with the live fish water tanks 6.

If the protein skimmer 20 and the wet-type filtering tanks 7 are used together within the cargo room 3, it can collectively remove floating matters, protein components, ammonia or nitrogen gases by air sampling in air introduced through the air supply tube 25a. As a result, live fish water which does not have any floating matter, protein component, ammonia gas or nitrogen gas can be re-provided through the water supply tube 24b to the live fish water tanks 6.

Since floating matters and protein components may be accumulated at wet-type filtering media and so they are non-perishable, disease or death of the live fish can prevented in advance, thereby enabling the transportation period and transportation distance for the live fish obtained by the live fish container to be maximized. Since the live fish can be transported over a long distance for a long time at low logistics costs by using the live fish container ship according to the present invention, it is possible to export the live fish to or import from a far-away country by ship or train and also it is possible to transport the live fish to distance lands by automobile.

Bubbles introduced into and stored in the bubble tank 23 may collapse as time passes and then they may be formed as filtrate. Since this filtrate contains containments derived from various floating matters and protein components, it is likely to be decomposed and it becomes wastewater having a bad smell. This bad smell can be spread from the bubble tank 23 to the interior of the cargo room 3 during the transporting process of live fish. Consequently, various noxious gases may be brought into contact with live fish water and thereby the live fish water may be contaminated.

In order to prevent that the above circumstance occur, air circulating means may be installed at the live fish container 1. As shown in FIGS. 1 and 2, an exhaust pipe 2a is formed through the main door 5 or the wall (W) of the container main body 2 so as to maintain an interior space of the cargo room at a pleasant residential environment. Furthermore, an air blower 15 is installed at the driver unit 4 together with a motor 15a so as to introduce an external air into the cargo room 3.

The air blower 15 can be installed together with the water cooling apparatus 10. Alternatively, the air blower 17 can be installed at a space that is a ventilation chamber created at an upper side of the driver unit 4. The ventilation chamber can function to allow the chill to be introduced into the cargo room 3 in accordance with the operation of a cooling fan and to allow the air presented within the cargo room 3 to be exhausted to the outside.

If an external air is introduced into the cargo room 3 due to the operation of the air blower 15, an internal air corresponding to the remaining air content, exclusive of the air introduced through the air supply tube 25a for the protein skimmer 20 among air supplied into the cargo room 3, may be exhausted through the exhaust pipe 2a to the outside together with the harmful gas having a bad smell. Accordingly, the atmosphere of the cargo room 3 is quite agreeable.

It is preferred that the exhaust pipe 2a is formed as a zigzag passageway so as to accomplish a natural air circulation due to the internal and external pressure difference of the container main body 2. An air inlet 15b for introducing an external fresh air is formed at an inlet part of the air blower 15. One end of an air supply tube 32 is fluid-communicated with an outlet part of the air blower 15. The air supply tube 32 extends from the driver unit 4 through a partition wall 2c to the interior of the cargo room 3.

The air supply tube 32 extends to a predetermined position adjacent to the bubble tank 23 after passing through the partition wall 2c. This air supply tube 32 is provided with a plurality of air holes 32a formed thereon at regular intervals.

It may safely be said that, with respect to the air supply tube 32 to be applied to the present invention, any design or installation state of the air supply tube 32 will do as long as it makes an external air to be introduced into the cargo room 3 by operating the air blower 15.

Figure 12:
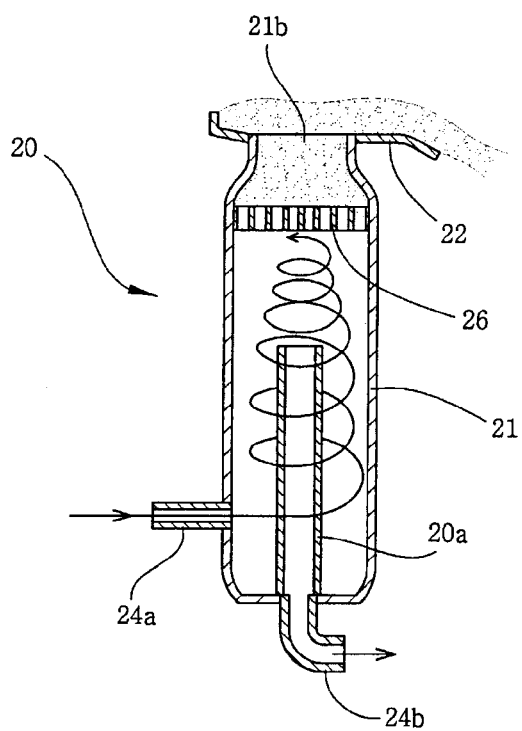
FIGS. 12 and 13 are sectional views for showing protein skimmer to be used in the present invention.
Figure 13:
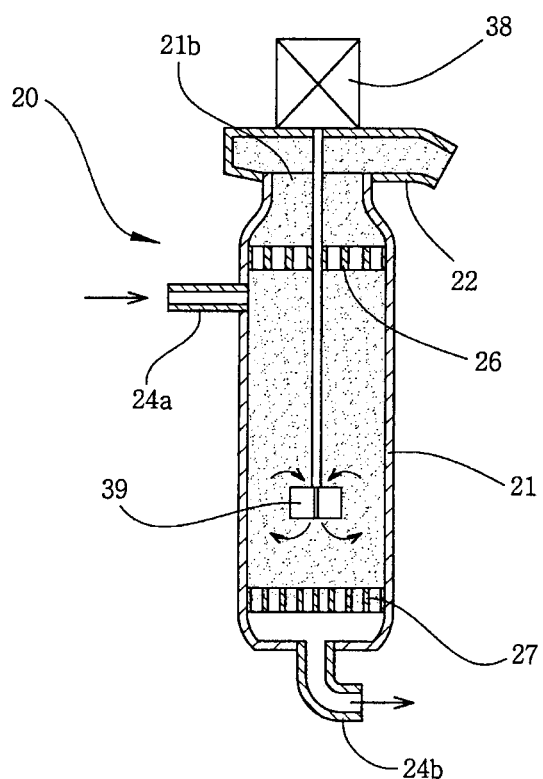

FIGS. 12 and 13 show other preferred embodiments of the protein skimmer 20 to be applied to the present invention. In detail, FIG. 12 shows a state that a whirlpool induction tube 20a is installed at a lower center portion of the skimmer main body 21 and the upper frame 26 is disposed above a level of an upper end of the whirlpool induction tube 20a. FIG. 13 shows a state that a stirring motor 38 is installed at an outer upper portion of the skimmer main body 21 and an impeller 39 is mounted to a lower end of a connecting rod downwardly extending from the stirring motor 38. The impeller 39 is disposed in the skimmer main body 21 between the upper frame 26 and the lower frame 27. The impeller 39 can function to disturb the flowing state of live fish introduced into the skimmer main body 21.

It may safely be said that, with respect to the protein skimmer 20 to be applied to the present invention, any sort of protein skimmer 20 will do as long as it has a simple structure and an excellent effectiveness of skimming, such as the protein skimmer 20 as shown in FIGS. 1 and 3, or FIGS. 12 and 13.

Although it was shown that one protein skimmer 20 and one bubble tank 23 are installed within the cargo room 3, it may be apparent to one of ordinary skill in the art that two or more protein skimmers 20 can be disposed in the cargo room 3 in series or in parallel according to the processing capacity of live fish water.

When two or more protein skimmers 20 are installed in the cargo room 3, the bubble tank 23 can be installed as a one high-capacity tank. Alternatively, the bubble tank 23 can be installed together with the protein skimmer 20 as a one set.

Figure 4:
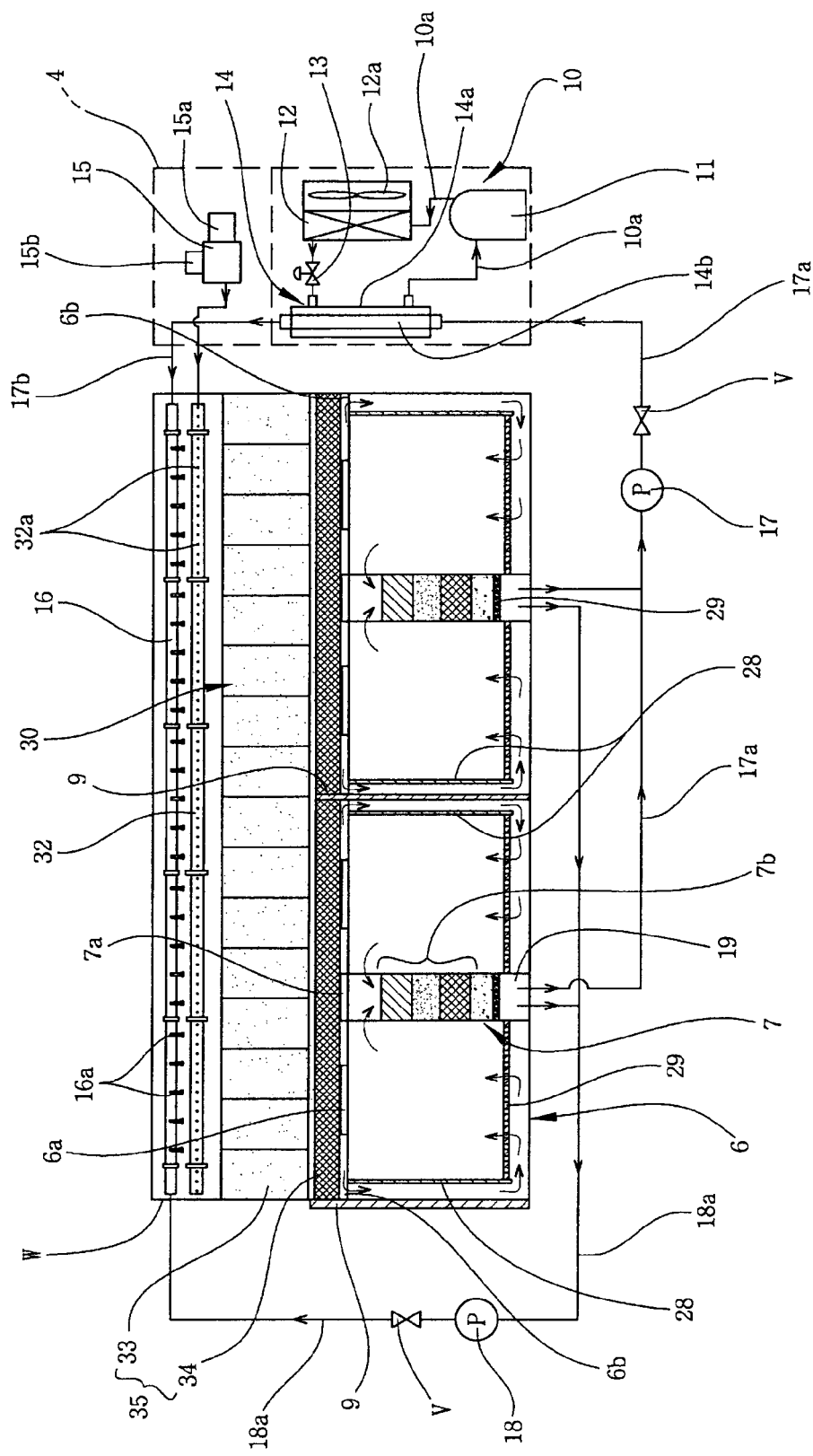
FIG. 4 shows a piping structure for circulating live fish water, for showing a cooling route and a dry filtering route of the live fish water.

Meanwhile, FIGS. 1, 2 and 4 also show a refrigerating unit comprising a compressor 11, a condenser 12 having a cooling fan 12a, an expansion valve 13, an evaporator and refrigerant pipes 10a for connecting them together. This refrigerating unit is the second important part of the live fish container according to the present invention and it is installed at the driver unit 4 in such a manner that the evaporator becomes the water cooler 14 and it is disposed within the air circulation chamber of the driver unit 4 together with the air blower 15.

One end of a water exhaust tube 17a having a circulation pump and extending from wet-type filtering tanks 7 is fluid-communicated with one side of the water cooler 14. A water supply tube 17b extends from the other side of the water cooler 14 through a partition wall 2c into the interior of the cargo room 3 and it returns to the live fish water tanks 6.

Although the water exhaust tube 17a extends from the wet-type filtering tanks 7 as shown in attached drawings, it may be apparent to one of ordinary skill in the art that the water exhaust tube 17a can be directly connected to the bottom surface of the live fish water tank 6 in a state that a wet-type filter media 24 is maintained at the inner bottom surface of the live fish water tank 6 instead of installing the wet-type filtering tanks at the outside of the live fish water tank 6. Also, those skilled in the art will appreciate that the circulation pump 17 can be installed at not the water exhaust tube 17a but the water supply tube 17b.

As described above, the opening and shutting valve (V) is installed at the water exhaust tube 17a together with the circulation pump 17. Likewise, the opening and shutting valve (V) can be installed at the water supply tube 17b. If the water cooling apparatus 10 works normally, the opening and shutting valve (V) is always open. Since it can control the flow of live fish by controlling the operation of the circulation pump 17, the opening and shutting valve (V) can be omitted based on application.

Figure 10:
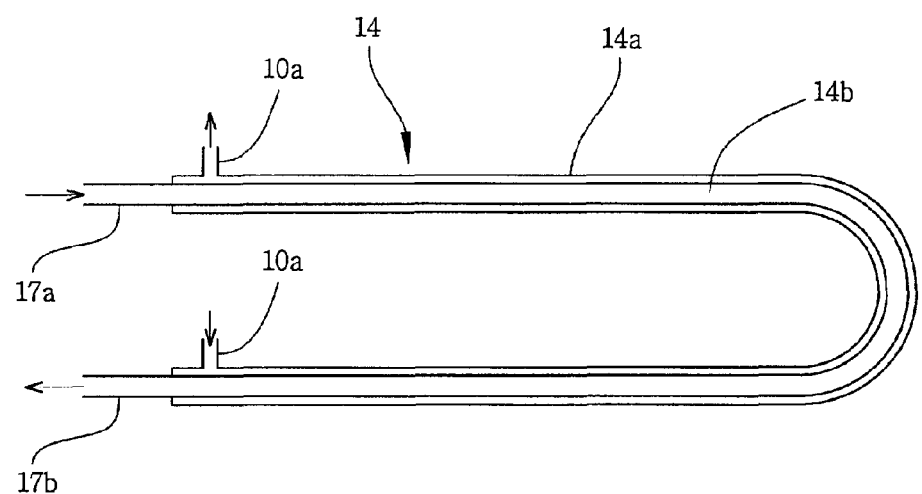
FIG. 10 shows a preferred embodiment of the live fish water cooler according to the present invention.
Figure 11:
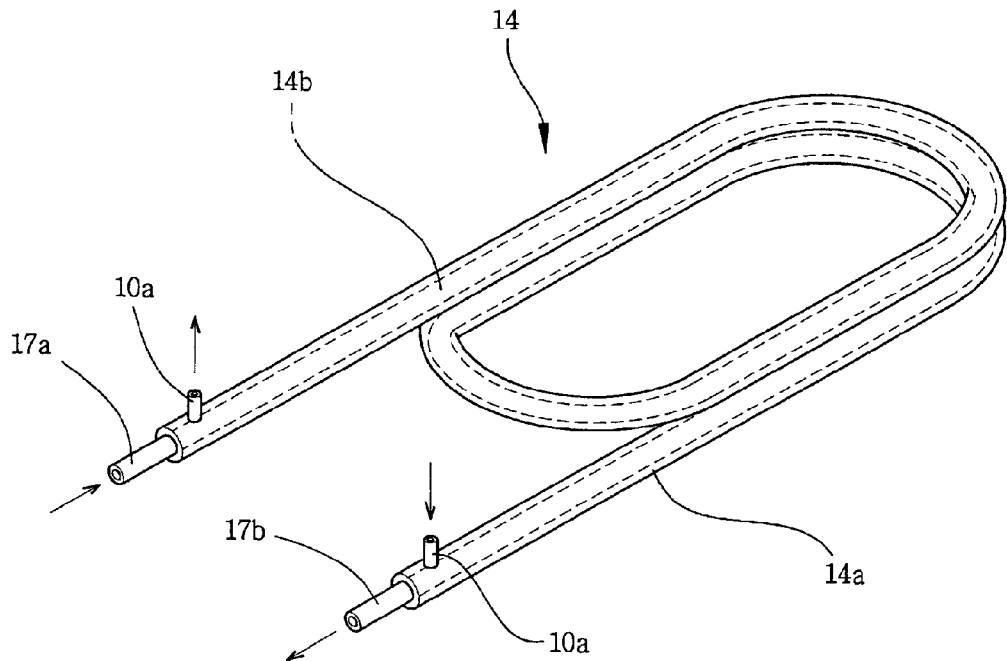
FIG. 11 is a perspective view of other preferred embodiment of the live fish water cooler according to the present invention.

It may safely be said that, with respect to the water cooler 14 to be applied to the live fish container 1, any sort of heat exchanger will do as long as it can make live fish water to be cooled by virtue of heat exchange between live fish water and refrigerants. As best seen in FIGS. 10 and 11, the water cooler 14 is formed as a double tube-type heat exchanger such that a water cooling tube 14b is longitudinally inserted into a refrigerant tube 14a formed as a "U"-shaped pipe or a coiled pipe.

If the water cooler 14 comprises the double tube-type heat exchanger as described above, it is possible to minimize the volume required for installing the water cooler 14 and to enhance the cooling performance of live fish. Although the refrigerant is leaked through a weld portion and a connecting portion of a refrigerant pipe 10a, the leaked refrigerant is not directly mixed in live fish. As a result, it can prevent live fish from dying owing to the leak of refrigerant and it allows a worker to easily ascertain and repair a portion related to the leak of refrigerant.

In the water cooler 14, the refrigerant tube 14a that is an outer pipe comprises a copper pipe and the water cooling tube 14b that is a seawater flow pipe comprises a titanium pipe having an excellent corrosion resistance. Due to this, the water cooler 14 constituted of the refrigerant tube 14a and the water cooling tube 14b has an excellent cooling effectiveness and is more shock-resistance. Accordingly, it is possible to lighten the weight of the water cooler 14 and to miniaturize the water cooler 1 so that it may be easily mounted in a relatively narrow space. Preferably, the water sealing process is performed so as to prevent live fish from being leaked and also the thermal insulation is performed in order to enhance the cooling effectiveness of the water cooler 14.

Although the compressor 11, the condenser 12, the expansion valve 13 and the evaporator 13 are disclosed as necessary elements to the cooling apparatus 10, some widely know mechanical parts such as a two-stage air compressor, a vibration attenuator for the compressor 11, a receiver tank, a dry filter, an oil-water separator, and an accumulator can be added to the refrigerating unit so as to increase the efficiency of the cooling cycle.

Live fish water supplied into the water cooler 14 may be introduced into the live fish water tanks 6 as a cooled water after it heat exchanging with the refrigerants under the state that the water cooler 14 is installed at the driver unit 4 for the live fish container 1. Even though any evaporator is not installed at the refrigerant pipe 10a within the live fish water tanks 6, it is possible to cool live fish water at a desire temperature. Consequently, it is possible to reduce maintenance time and cost related to the cooling apparatus 10 and thereby economic efficiency in the use of the live fish container 1 is highly enhanced.

The live fish water tanks 6 and the wet-type filtering tanks are installed in the cargo room 3 of the container main body 2 by using the laminating strategy with FRP (Fiber Reinforced Polymer) materials. In the live fish container 1 according to the present invention, the evaporator that is the refrigerating unit in the conventional refrigerant container is removed from the driver unit 4 and thereafter the water cooler 14 is mounted thereto, thereby resulting in the re-construction of the refrigeration cycle. Accordingly, the live fish water tanks 6 and the water cooling apparatus 10 can be formed as independent equipment, respectively.

Due to this, it is not necessary to perform the FRP laminating for the evaporator against the bottom portion or the side wall surface of the live fish water tanks 6 so that it is possible to reduce maintenance time and cost related to the cooling apparatus 10. Since an electric signal applicable to the driver unit 4 may follow the conventional technique, the defects of the system will be supervised in accordance with an automatic check system installed within the ship or the automobile.

As all of the refrigerant units including the water cooler 14 are integrated within the driver unit 4, the drive unit 4 may be manufactured separately from the cargo room 3. By performing the bolt engagement process, mechanical separation and engagement processes of the water exhaust tube 17a and the water supply tube 17b, the drive unit 4 can be easily combined to or separated from the cargo room 3.

Accordingly, a general cargo container can be simply used as the live fish container and it is possible to accomplish a systemed manufacturing process for the purpose of mass production of the live fish container 1. When the refrigerant unit is broken out or functions wrongly, it is possible to repair or replace the refrigerant unit on the spot without discharging live fishes or live fish water from the live fish container 1 in advance. Therefore, this leads to the minimization of a time period that the live fish container 1 is placed in out of service. Also, this leads to the maximization of the economic feasibility and the convenience in the use of the live fish container 1.

Furthermore, if the water cooling apparatus 10 is damaged due to the vibration or the shock applied to the live fish container 1 during the process of loading or unloading live fishes or during the transportation of the live fish container 1 by using a trailer, it is possible to easily repair damaged parts in the refrigerant unit or various pipes at the interior of the cargo room 3 or the outside of the container main body 2 without discharging live fishes or live fish water contained within the live fish water tanks 6 in advance.

When the water cooling apparatus 10 operates, live fish water may be cooled by means of refrigerants during the circulation of live fish water through the water cooler 14. At this time, live fish waters stored in the live fish water tanks 6 have almost identical cooling temperatures. It may be apparent to one of ordinary skill in the art that it is not necessary to have any additional piping structures within the live fish water tanks 6.

And incidentally, it is possible to prevent the body of the ship from being damaged by the piping structure for circulating the refrigerant projecting into the live fish water tanks 6. Furthermore, it is possible to prevent the refrigerant from being leaked through welded parts or connecting parts of the pipes. Furthermore, it is possible to prevent live fish water from being secondarily contaminated due to the formation of scales within the pipe for circulating the refrigerant and thereby this leads to cleaning convenience. And incidentally, it is possible to transport live fish over short distances for a short time in a state that the live fishes contained in the live fish container are maintained with ensuring the safety and the security thereof.

As best seen in FIG. 4, it is preferred that the water supply tube 17b extending from the water cooler 14 to the interior of the cargo room 3 is fluid-communicated with a water injection tube 16 having a plurality of water injection nozzles 16a, in which the water injection tube 16 is installed above the level of the dry filtering members 35 and extends along the longitudinal direction of the dry filtering members 35.

When live fish water injected from the water injection nozzles 16a of the water injection tube 16 is injected into the live fish water tanks 6, the air introduced through the air holes 32a of the air supply tube 32 may be easily mixed with the live fish water injected by the injection nozzles 16a at fine particles.

Therefore, the water cooling apparatus 10 can take advantage of performing two functions such as the cooling of live fish water and the supply of oxygen. Although any additional oxygen generator such as a bubble generator is not installed in a space defined by a porous partition 29 and the bottom surface of the live fish water tanks 6, it is possible to supply a sufficient quantity of oxygen for growing up live fishes.

Meanwhile, the dry filtering tank 30 is the second important part of the live fish container according to the present invention and it may be applicable together with the layout structure of the water injection tube 16 and the air supply tube 32. As shown in FIGS. 1, 2 and 4, the dry filtering tank 30 is installed at a one upper side in an interior of the live fish water tank 6 within the cargo room 3. At this time, the water injection tube 16 and the air supply tube 32 are disposed at the inner upper side of the dry filtering tank 30.

The reason that the dry filtering apparatus 30 is installed at the upper portion of the outside of the live fish water tank 6 together with the bubble tank 23, is because it is possible to obtain some space for allowing a worker move so as to load and unload the live fish. If the dry filtering apparatus 30 is installed in this space, there is no hindrance for installing other equipments including the live fish water tank 6. The live fish water can be re-entered into the live fish water tank 6 after passing through the dry filtering apparatus 30 without employing additionally flowing tubes.

Figure 5:
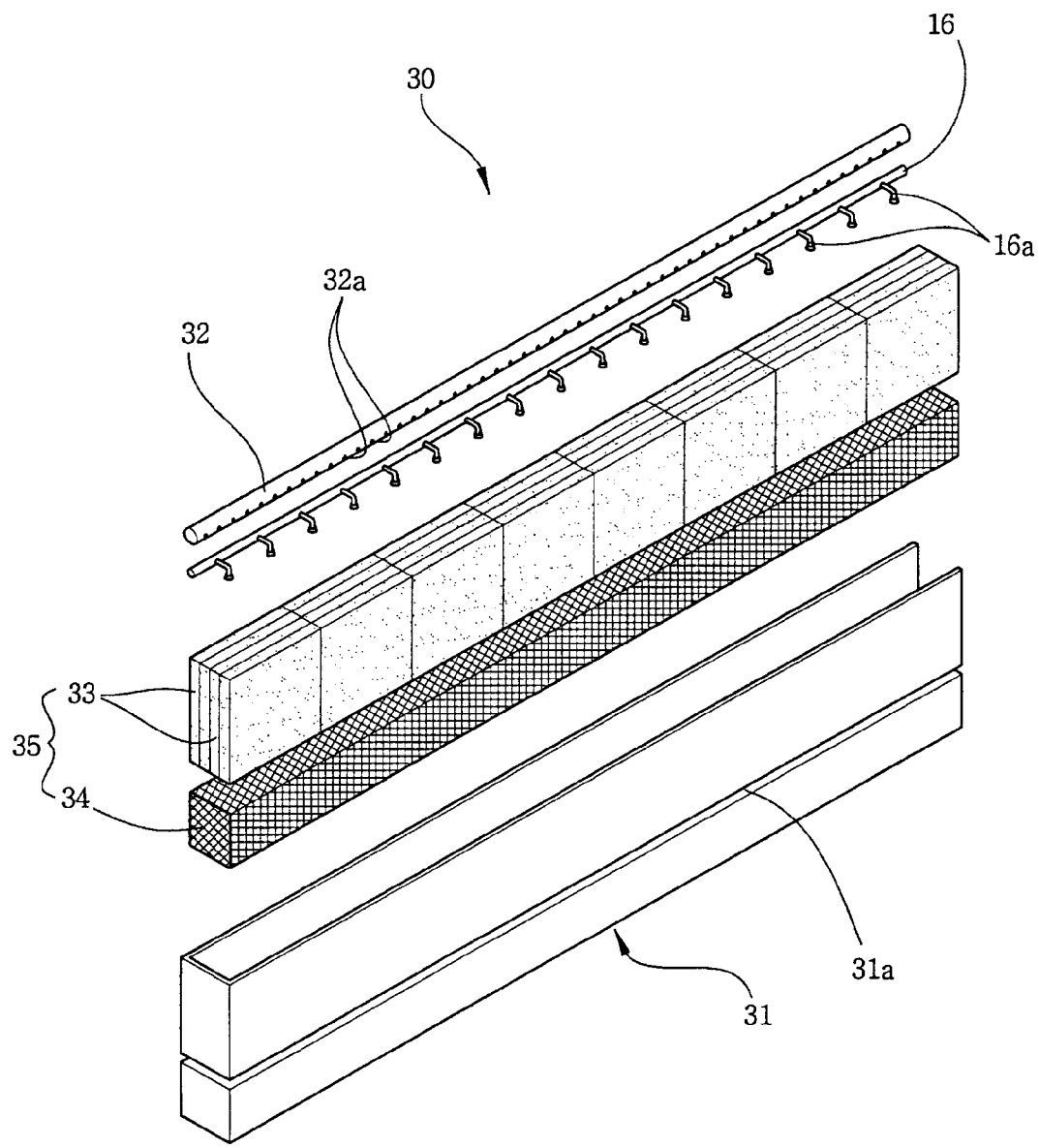
FIG. 5 is an exploded perspective view of a dry filtering apparatus according to the present invention.
Figure 6:
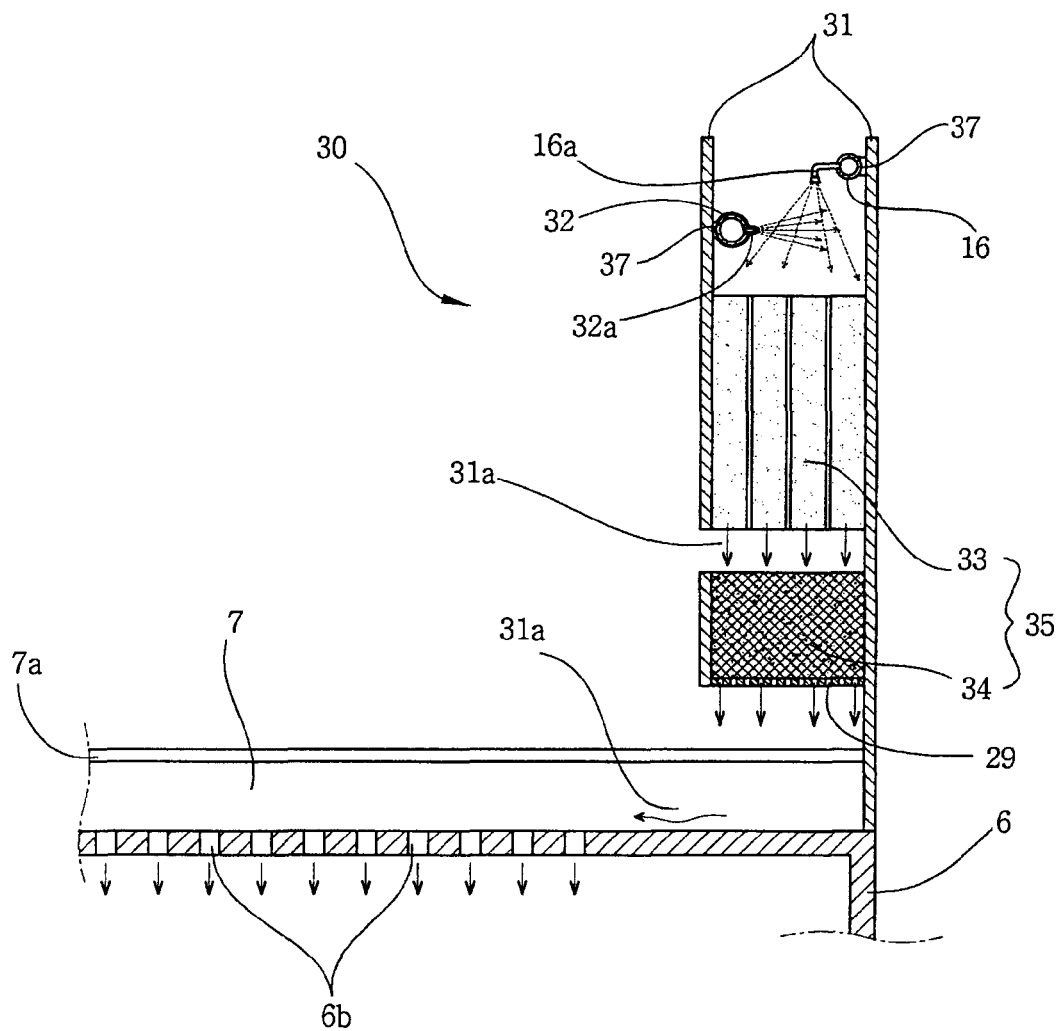
FIG. 6 is a side sectional view for showing an installation state of the live fish container together with the dry filtering apparatus.

As shown in FIGS. 4 to 6, the dry filtering tank 30 comprises a filtering tank cover 31 and a plurality of dry filtering members 35 inserted between the filtering tank cover 31 and the walls of the container main body 2.

The filtering tank cover 31 may be formed as a plate-shaped structure in the light of installing the air supply tube 32 and the water injection tube 16, of which an upper end is open for allowing a dry filtering member 35 to be inserted and then to be supported therein. Since an outer bottom surface of the filtering tank case 31 is spaced apart from the upper side of the live fish water tank 6, a plurality of drains 27 may be provided at the space between the filtering tank cover 31 and the live fish water tanks 6.

The reason that the plurality of drains 27 are provided at the space between the filtering tank cover 31 and the live fish water tanks 6, is because it is possible to obtain a sufficient long detention time for live fish water flowing through open space so as to enhance the purification performance, by making live fish water exhausted through the dry filtering member 35 flow along the upper surfaces of the live fish water tanks 6 and then it to be introduced into the interiors of the live fish water tanks 6.

For this purpose, a plurality of water flowing holes 6b for introducing live fish water after passing through the dry filter member 35 into the live fish water tanks 6 are formed at a one upper side surface of the live fish water tanks 6 at regular intervals. A wash board 9 is provided at the upper side of the live fish water tank 6 so as to prevent the live fish water from flowing over. A part of the wet-type filtering tank 7 protruding from the upper portion of the live fish water tank 6 can function as the wash board 9.

As best seen in FIG. 4, live fish water introduced into the live fish water tank 6 through the plurality of water flowing holes 6b may be induced toward the inner bottom side of the live fish water tank 6 along a flowing control plate 28 and then it flows upwards within the live fish water tank 6. Thereafter, the live fish water flows into the upper side of the wet-type filtering tanks 7 and it passes through the wet-type filter media 7b and the porous partition 29 and it returns to the water cooler 14.

The porous partition 29 installed at the inner lower side of the live fish water tanks 6 as shown in the drawings can function to uniformly spread live fish water induced toward the bottom surface of the live fish water tanks 6 and then it makes live fish water to flow upwards within the live fish water tanks 6. Furthermore, the porous partition 29 may provide a space required for installing an oxygen generator such as a bubble generator at the bottom part of the live fish water tanks 6 as needed. Furthermore, the porous partition 29 can function to prevent the wet-type filter media 7b from being leaked and it may provide a proper space, that is a water discharge chamber 19, at which the water exhaust tube 17a or the pressure tube 18a can be disposed.

From the viewpoint of purifying live fish water, it is preferred that the flowing path of live fish water is formed as shown in FIGS. 4 and 6. The flowing path of live fish water flowing from the drain passageway 31a of the dry filtering tank to the interior of the live fish water tanks 6 can be adjusted in accordance with the installation position of the wet-type fitter media 7b and the circulation direction of live fish water.

For example, when the wet-type fitter media 7b is installed on the bottom surface of the live fish water tanks 6, live fish water discharged through the drain passageway 31a of the dry filtering tank 30 can be introduced into the live fish water tanks 6 along the water flowing holes 6b formed at the border of the live fish water tanks 6. Alternatively, live fish water passing through the drying filtering member 35 can be introduced into the live fish water tanks 6 in the direction perpendicular to the dry filtering member 35 via a passageway (not shown) provided on the upper surface of the live fish water tanks 6.

It may safely be said that, with respect to the drying filtering member 35 to be applied to the dry filtering apparatus 30, any sort of filter media will do as long as it can remove a variety of harmful ingredients contained in the live fish water while the live fish water injected from the injection nozzle 16a of the water injection tube 16 flows along the drying filtering member 35. Preferably, the drying filtering member 35 comprises a porous material which is capable of removing the harmful ingredients by the absorption process and of impregnating and cultivating microorganism. It is preferred that the porous material must have a maximum filtering surface area.

In view of the foregoing, as shown in FIGS. 5 and 6, the drying filtering member 35 comprises a porous pellet filter 34 positioned at an inner lower side of the filtering tank cover 31, and porous fiber filters 33 positioned above the pellet filter within the filtering tank case 31. It is preferred that microorganism for purifying the live fish water are impregnated and cultivated in the pellet filter 34 and the fiber filters 33.

Proper space is provided between the drying filtering members 35, that is, the fiber filters 33 and the pellet filter 34 so as to allow the air smoothly flow there through. Preferably, oxygen can be supplied through the drying filtering member 35 to the filtering tank cover 31 so as to increase the biological filtering efficiency. For this purpose, there is a drain passageway 31a at a center portion of the filtering tank cover 31, which is corresponding to the position between the fiber filter 33 and the pellet filter 34. A porous partition 29 is provided at the lower portion of the pellet filter 34 so as to prevent pellet components from being leaked.

The type of the fiber filter 33 may vary based on application. For example, the fiber filter 33 can be formed by laminating a non-woven fabric having a predetermined thickness or a sponge, or a thin cloth as several layers. It is the most preferred that a plurality of filter units having a plate shape are tightly contacted with each other along the longitudinal and the horizontal directions of the filtering tank cover 31, as shown in the attached drawings.

The pellet filter 23 may be formed by densely filling porous pellets comprising porous solid particles having a relatively small diameter into a mesh. It may safely be said that any sort of porous pellets will do as long as they comprise porous solid particles. For example, the pellet comprises a porous stone or a plastic particle. Alternatively, the pellet comprises a piece of sponge or shell. Alternatively, the pellet comprises an activated carbon.

Notable examples of microorganisms to be impregnated and cultured in the dry filtering member 35 are aerobic nitrate microorganisms, which are so-called as *Nitrosomonas* and *Nitrobacter*.

The bacteria so-called as *Nitrosomonas* can function to oxidize ammonia components such as $NH_3$, $NH_4^+$ to $NO_2^-$. The bacteria so-called as *Nitrobacter* can function to oxidize $NO_2^-$ to $NO_3^-$, which are harmless to aquatic organisms.

The biological purifying reaction formula is as follows:

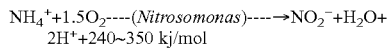

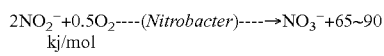

*Nitrosomonas* and *Nitrobacter* for removing ammonia and nitrogen components may be mainly used to process fresh water. A large quantity of *Nitrosomonas* and *Nitrobacter* are impregnated in the dry filtering member 35 at a high concentration and then the impregnated dry filtering member 35 is immersed into sea water for about 10~20 days. As a result, the microorganisms described above may be cultured and domesticated in sea water.

*Nitrosomonas* and *Nitrobacter* to be used for removing ammonia and nitrogen components contained in the live fish water are two mere microorganisms to be applied to the dry filtering apparatus according to the present invention. It may safely be said that any sort of microorganisms will do as long as they can function to remove ammonia and nitrogen components contained in the live fish water. It is possible to use a variety of microorganisms after mixing them in accordance with the sort of materials (bacteria or other chemical substances) to be processed.

It should be appreciated by one of ordinary skill that some microorganisms such as *Nitrosomonas* and *Nitrobacter* are mixed with each other and then the mixed microorganisms can be impregnated and cultured in the dry filtering member 35. Alternatively, It should be appreciated by one of ordinary skill, that some microorganisms such as *Nitrosomonas* and *Nitrobacter* can be independently impregnated and cultured in the fiber filter 33 and the pellet filter 34, respectively.

When aerobic microorganisms are impregnated and cultured on the dry filtering member 35, it is preferred that oxygen sufficient to be consumed by microorganisms can be supplied by making a large quantity of air to be dissolved in the live fish water injected from the injection nozzle 16a of the water injection tube 16. For this purpose, an air supply tube 32 is installed above the level of the dry filtering member 35. This air supply tube 32 is located at a position adjacent to the water injection tube 32 and is provided with a plurality of air holes 32a formed on the air supply tube 32 at regular intervals.

Now referring to FIG. 6, the air holes 32a of the air supply tube 32 are located below the injection nozzle 16a of the water injection tube 16. Preferably, the air holes 32a are formed at a side portion of the air supply tube 32. The live fish water injected from the injection nozzle 16a of the water injection tube 16 cross the air introduced via the air holes 32a at a right angle. Due to this, the frictional contact force between the live fish water and the air is increased and thereby a large quantity of air can be supplied into the live fish water.

It is to be understood that the spatial layout of the air supply tube 32 and the water injection tube 16 and the contact mode between the air and the live fish water are not limited in its application to the details of construction and to the arrangements of the components set forth in the above description or illustrated in the drawings. Although the air supply tube 32 and the water injection tube 16 are fixed to the wall (W) of the live fish container 1 and the inner surface of the filtering tank cover 31 and by a bracket 37, it is possible to fix and install them by using other fixing means.

If the dry filtering apparatus 30 is installed in the cargo room 3 of the live fish container 1 as the best mode described above, the drying filtering member 35 may not be immersed into the live fish water so that it does not affect the loading capacity of the live fish container 1. Since the live fish water injected from the injection nozzle 16a may flow along the drying filtering member 35, the purifying performance with respect to the live fish water is very good.

Accordingly, the container according to the present invention can provide a desired level of purification performance by only employing the dry filtering apparatus 30 without having the conventional wet-type filtering tank 7. If the dry filtering apparatus 30 is employed in the container together with the conventional wet-type filtering tank 7, it is possible to provide more excellent purification performance and to reduce the volume of the wet-type filtering media 7b at maximum so as to obtain sufficiently large storage space for the live fish.

The quantity of live fish to be transported at once to the live fish container 1 can be highly increased in comparison with the prior art. This leads to substantial reduction of logistics costs for transporting live fish. Also, this can prevent the situation that, the live fish container 1 cannot be transported due to the weight restriction of the live fish container 1, from it occurs.

Since a variety of harmful ingredients such as ammoniac nitrogen components contained in the live fish can be effectively removed by using the protein skimmer 20 and the microorganisms presented on the drying filtering member 35, disease or death of the live fish can prevented in advance, thereby enabling the transportation period and transportation distance for the live fish obtained by the live fish container to be maximized.

Since the live fish can be transported over a long distance for a long time at low logistics costs by using the live fish container ship according to the present invention, it is possible to export the live fish to or import from a far-away country by ship or train and also it is possible to transport the live fish to distance lands by automobile.

FIG. 4 shows a piping structure for circulating live fish water, for showing a cooling route and a dry filtering route of the live fish water. As shown in FIG. 4, one end of the water supply tube 17b extending through the water cooler 14 is fluid-communicated with one side of the water injection tube 16. One end of a pressure tube 18a extending from the wet-type filtering tanks 7 is fluid-communicated with the other side of the water injection tube 16, in which a press pump 18 is disposed at a middle portion of the pressure tube 18a between the wet-type filtering tanks 7 and the water injection tube 16. Due to this structure, it is possible to further highly increase an injection pressure of the live fish water to be injected from the injection nozzle 16a of the water injection tube 16 due to co-operation between the circulation pump 17 and the pressure pump 18.

If the injection pressure of the live fish water injected from the injection nozzle 16a of the water injection tube 16 is increased, the particle size of the live fish water becomes smaller and the injection width of the live fish water can be enlarged. As a result, much more quantities of air can be dissolved into the live fish water during the injection of the live fish water. This result in generation of the sufficient oxygen required to be consumed by microorganisms. Also, it is possible to obtain the sufficient dissolved oxygen of the live fish water.

Figure 7:
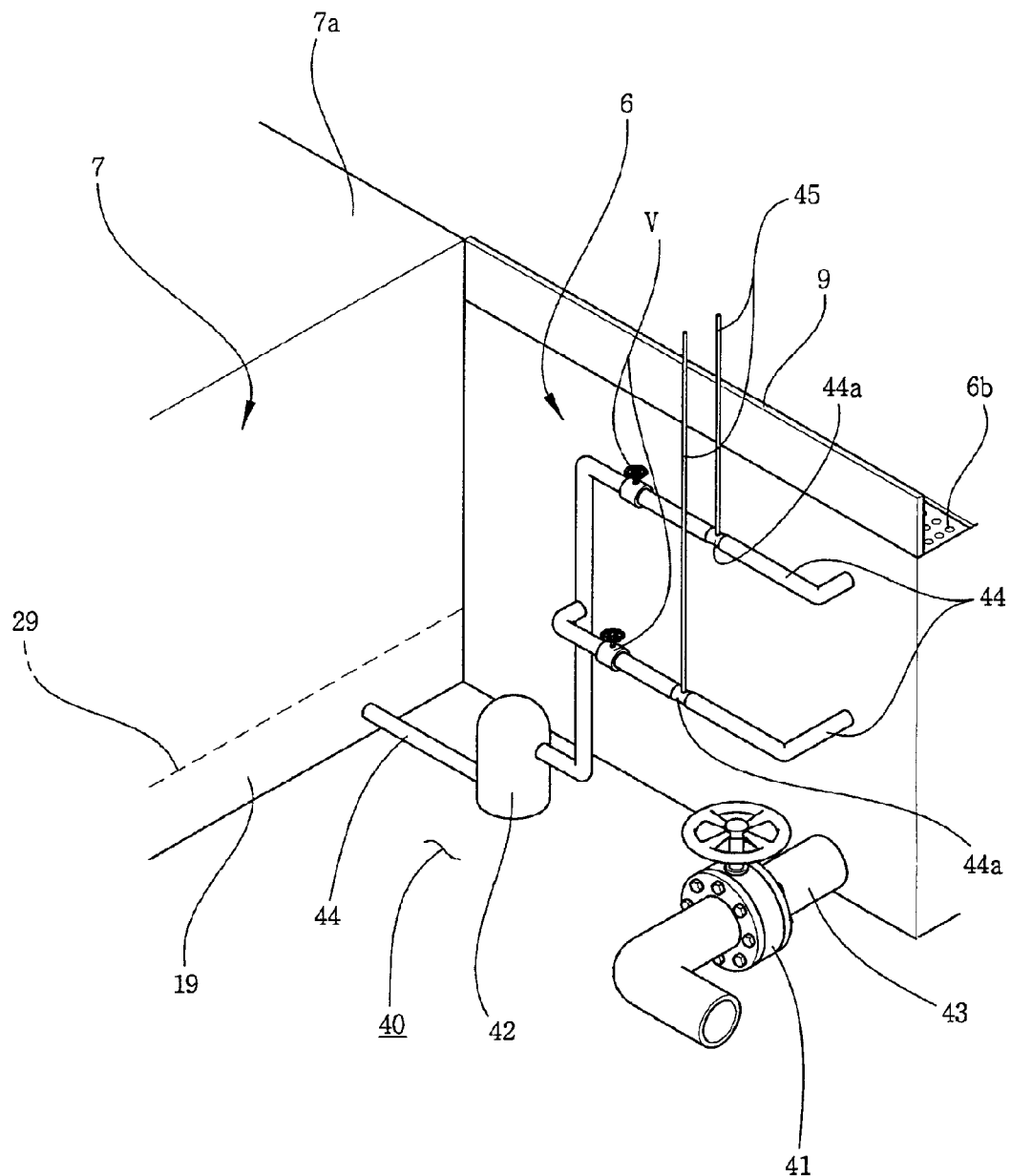
FIG. 7 is a partially cutaway perspective view of important parts of the live fish container, for showing a working space provided together with the wet-type filtering tank between the live fish containers.

As shown in FIGS. 1, 2 and 7, another important constitutional feature of the live fish container according to the present invention is that a working space 40 for loading and unloading live fish is provided at a position adjacent to the live fish water tanks 6 by controlling the size of the wet-type filtering tanks 7 to be installed between the live fish water tanks 6 or to be installed at the outside of the live fish water tanks 6. Also, other important constitutional feature of the live fish container according to the present invention is that auxiliary means for loading and unloading live fish and auxiliary means for circulating live fish water are provided at the working space 40. Other constitutions are the same as those as described above.

Referring to FIG. 2, the wet-type filtering tank 7 substantially corresponds to the half of a space defined between the live fish water tanks 6. Likewise, the working space 40 substantially corresponds to the half of the space defined between the live fish water tanks 6. However, spaces corresponding to the wet-type filtering tank 7 and the working space 40 can be properly controlled as needed. An auxiliary door 2b for allowing a worker to enter is installed at the wall (W) of the container main body 2 at a position adjacent to the working space 40. Like the main door 5, it is preferred that the auxiliary door 2b has the function of heat insulation and the sealing function by cooperation with door opening and shutting means.

As best seen in FIG. 7, live fish loading means comprising a drain pipe 43 and a drain valve 41 is installed at the inner side of the working space 40. The live fish loading means further comprises an auxiliary means for circulating live fish water, which is constituted of an auxiliary circulation pipe 44, an auxiliary circulation pump 42 and an air supply tube 45. The air supply tube 45 is located at a position above the level of the live fish water tanks 6.

The drain pipe 43 having the drain valve 41 installed at the middle portion thereof can function to load live fishes such as an eel, the young of fishes, a shrimp, etc. into the live fish water tanks 6 together with live fish water or can function to unload these live fishes there from. When the porous partition 29 is installed at the lower side of the live fish water tanks 6, the drain pipe 43 may be installed at the upper side of the live fish water tanks 6. Preferably, the drain valve 41 comprises a butterfly valve.

The auxiliary circulation pipe 44 for circulating live fish water from the wet-type filtering tanks 7 toward the interior of the live fish water tanks 6 is fluid-communicated with the auxiliary circulation pump 42. Accordingly, the water discharge chamber 19 provided at a place below the porous partition 29 of the wet-type filtering tanks 7 is fluid-communicated with the live fish water tanks 6 through the auxiliary circulation pipe 44. Live fish water purified while it flowing through the wet-type filter media 7b can be circulated toward the live fish water tanks 6.

Although the auxiliary circulation pipe 44 divides into two pipes after passing by the auxiliary circulation pump 42 and an opening and shutting valve (V) is respectively disposed at the branched auxiliary circulation pipes, the numbers of the auxiliary circulation pipe 44 can be properly selected and the opening and shutting valve (V) can be selectively installed as needed.

A nozzle 44a is formed at a middle portion of the auxiliary circulation pipe 44 extending from the auxiliary circulation pump 42 toward the live fish water tanks 6, and an air supply tube 45 is fluid-communicated with the nozzle 44a. As described above, an internal air may be mixed into live fish water at fine bubbles having a micron size taken along the air supply tube 45 during the circulation of live fish water through the auxiliary circulation pipe 44.

It is possible to secure a sufficient dissolved oxygen during the supply of live fish water from the injection nozzle through the filter media to the live fish water tank, by installing the air supply tube 25a at the protein skimmer 20, by installing the air supply tube 32 at the dry filtering tank 30 together with the water injection tube 16, and by installing the air supply tube 45 at the auxiliary circulation means. Accordingly, even though any additional oxygen generating device such the bubble generator is not installed in the live fish container 1, the live fish stored in the fish tank of the live fish container 1 can be kept fresh over a long period of time for transportation, and the time period of transporting live fish and the distance able to be covered by the live fish transporting container can be extended to the maximum.

As described above, the working space 40 for loading and unloading live fish is provided at a position adjacent to the live fish water tanks 6, an auxiliary door 2b for allowing a worker to enter is installed at the wall (W) of the container main body 2 at a position adjacent to the working space 40, and a drain pipe 43 extends from the lower end of the live fish water tank 6 at a bottom side of the working space 40, in which a drain valve 41 is installed at a middle portion of the drain pipe 43.

Herein below, the process for unloading live fish from an automobile for transporting live fish will be briefly explained. Under the state that the working space 40 is provided at the outside of the live fish water tanks 6 or between the live fish water tanks 6 and the live fish loading means 41,43 are provided in the working space 40, an automobile for transporting live fish over a short distance enters a predetermined unloading place at which the live fish container 1 is located. Thereafter, a worker connects the drain pipe 43 to the live fish tank of the automobile by using a flexible hose. Then, if the worker opens the drain valve 41, live fishes contained in the live fish water tanks 6 may be easily unloaded from the automobile to the unlading place.

Herein below, the process for loading live fish will be briefly explained. Under the state that the live fish tanks of the automobile is located at a place above the level of the live fish water tanks 6 of the live fish container 1, the worker connects the drain pipe 43 to the live fish tank of the automobile by using a flexible hose. Then, if the worker opens the drain valve 41, live fishes contained in the live fish tanks may be easily loaded to the interior of the live fish water tanks 6 together with live fishes contained in the live fish tanks.

Therefore, it is possible to reduce the expenses required for loading and unloading live fishes at maximum by minimizing the time and the cost of labor during loading and unloading process of live fishes. The live fish container 1 according to the present invention may be very usefully applied to the process for loading and unloading the young of fishes, shrimps, and a slippery fish and so on. The live fish container 1 according to the present invention can prevent live fish from being damaged at the time that live fishes are transported by putting them in a water bottle, a basket or a scoop net.

Figure 8:
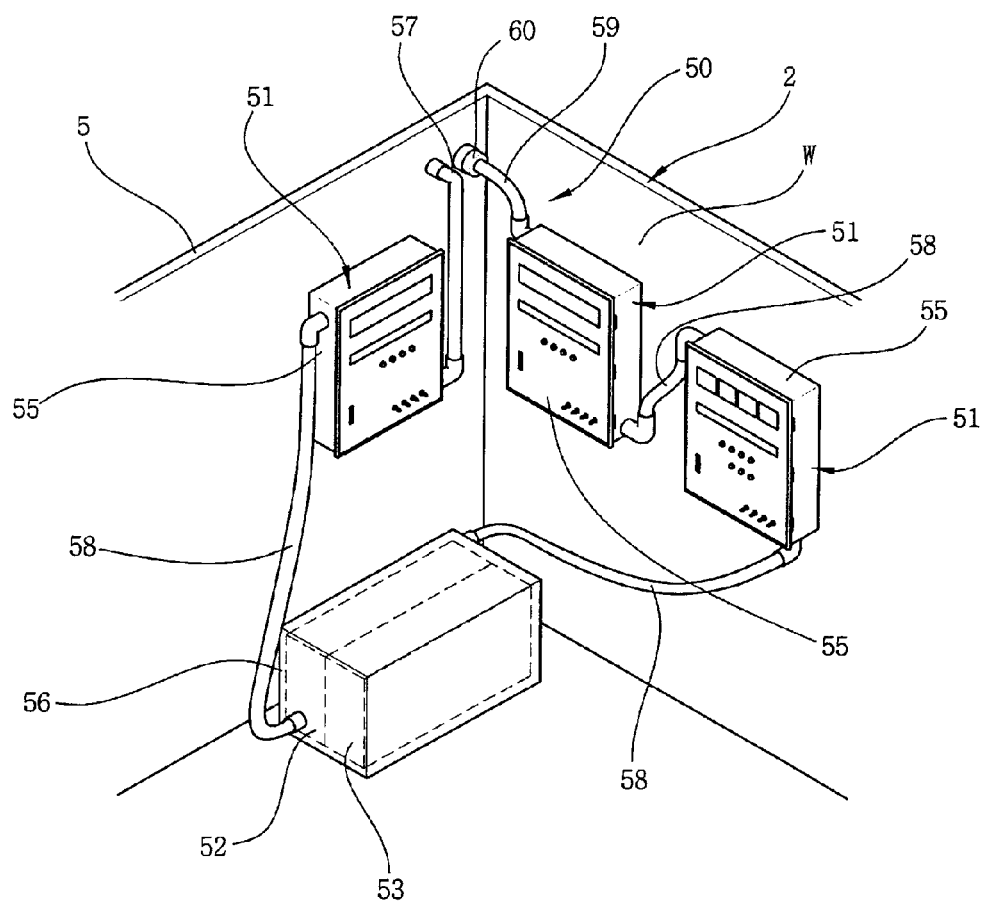
FIG. 8 is a partially cutaway perspective view of important parts of the live fish container, for showing a cooling structure of the control part.

Meanwhile, other important constitutional elements are shown in FIGS. 1, 2 and 8. FIGS. 1, 2 and 8 show an apparatus for cooling the control part 50 of the live fish container 1 by using an external air. The control part 50 is installed at the inner front side of the cargo room 3 and can function to operate some pumping means.

As best seen in FIG. 8, the control part 50 comprises three control panels 51 installed on the main door 5 and the wall (W) of the container main body 2, an inverter 52 and a battery 53, which are installed on the bottom surface of the cargo room 3, in which electronic control means of the control panel 51 are inserted into an enclosed type panel case 55, and the inverter 52 and the battery 53 are inserted into an enclosed type battery case 56.

The panel case 55 and the battery case 56 are formed as an enclosed type case in such a manner that they are waterproof and water sealed in order to prevent electronic control means of the control panel 51 or the inverter 52 and the battery 33 from contacting with moisture or air containing salt components. Since the panel case 55 and the battery case 56 are formed as the enclosed type case having a door, it is possible to repair the control panel 51 after opening the door and it can replace the waste battery 53 with a new battery 53.

The door of the panel case 55 may be formed as a viewing glass window such that a worker can ascertain the control state of the live fish container 1 with naked eyes within the cargo room 3. Various display windows, regulators and switching means may be provided at a front side surface of the control panel 51 so that the worker can control the control panel 51 under the state that the viewing glass window is open. The battery case 56 is provided with a transparent plastic case over the front side of the control part so that the worker can ascertain the initial state and the operating state of the inverter 52 and the battery 53.

The panel cases 51 are connected with the battery case 56 via a plurality of connecting tubes 58. Also, an air supply pipe 57 extends from the main door 5 or the wall (W) of the container main body 2 to the control panel 51, an air discharge pipe 59 extends from one of the control panel 51 to the main door 5 or the wall (W) of the container main body 2, and a plurality of connecting tubes 58 extend between the panel cases 55 and the battery case 56 or between the panel cases 55, whereby it may provide a circulation passage for external air.

An air blower 61 may be installed at the air supply pipe 57, the air discharge pipe 59 or an interior of the panel case 55. An external air can be circulated through the cases 55,56 due to the operation of the air blower 61. The heat generated during the operations of the control panel 51, the inverter 52 and the battery 53 can be cooled by the external air.

Figure 9:
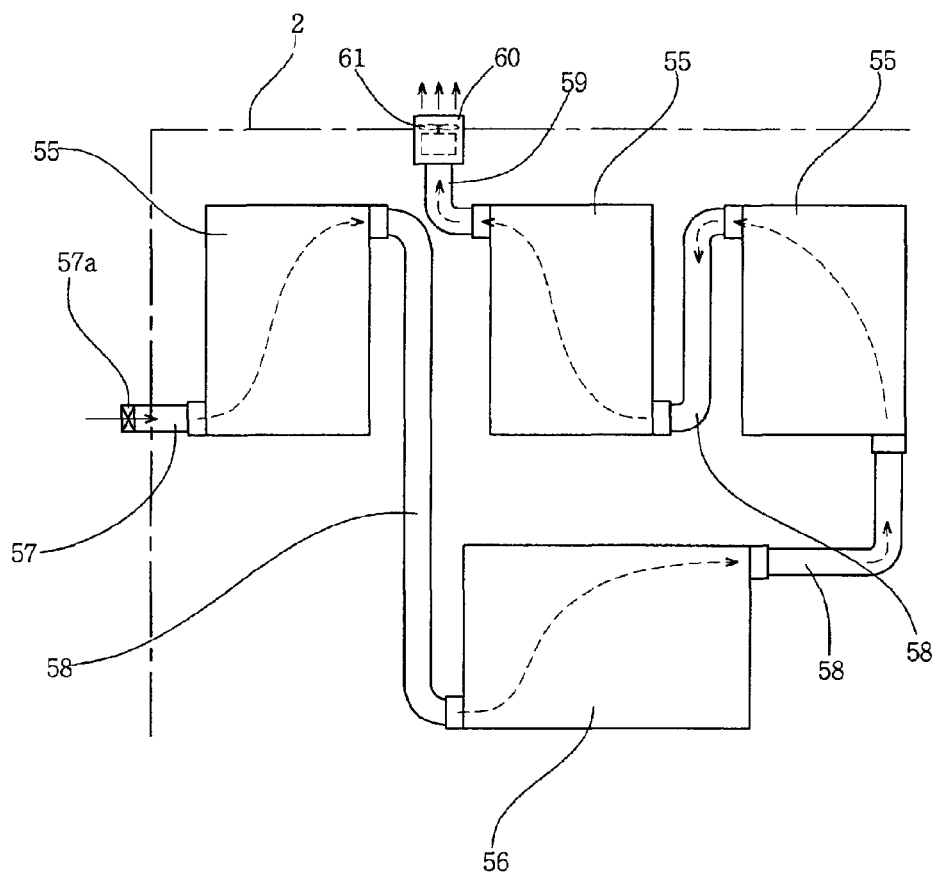
FIG. 9 shows a piping structure of important parts as shown in FIG. 8, for illustrating a refrigerating principle of the control part.

As best seen in FIG. 9, if the flowing direction of the air through the internal space of the cases 55,56 is a diagonal direction projecting from the inner lower side of the cases 55,56 to the inner upper side thereof, it can more effectively perform the cooling process of the control part 50 due to the circulation of the external air. This principle is based on the convective activity, which is described with the observation of the fact that heats generated from the electronic components are gathered to the inner upper portion of the cases 55,56.

For this purpose, the air supply tube 57, the connecting tubes and the air discharge tube 59 may be connected with the corner sides of the cases 55,56 in accordance with the flowing direction of the external air. The air discharge pipe 59 and the connecting tubes 58 extend between corners of the panel cases 55 and the battery case 56 so as to create an air stream to flow in a diagonal direction at interiors of the panel cases 55 and the battery case 56. Preferably, the air supply tube 57, the connecting tubes 58 and the air discharge tube 59 comprise a flexible tube that can be rounded in a proper direction as needed. It may be apparent to one of ordinary skill in the art that the air supply tube 57, the connecting tubes 58 and the air discharge tube 59 can be disposed in the cargo room 3 in series or in parallel as needed.

It is preferred that an air blower 61 is inserted into the air supply tube 57, the connecting tubes 58 and the air discharge tube 59 so as to prevent the air blower 61 from contacting with the internal air of the cargo room 3. Alternatively, the air blower 61 can be installed in the panel case 55. Alternatively, the air blower 61 can be installed at the main door 5 or the wall (W) of the container main body 2 under the state that the air blower 61 is inserted into additional blower case 60.

Preferably, the operation of the air blower 61 is controlled on the basis of a signal generated by a temperature sensor (not shown) inserted into the cases 55,56. The operation and the control of the air blower 61 are performed by the control panel 51, the inverter 52 and the battery 53 in the same manner as other devices installed in the cargo room 3. Preferably, an air filter 57a for removing foreign materials contained in the external air is installed at the middle portion of the air supply tube 57.

Although FIGS. 8 and 9 show a preferred embodiment of the apparatus for cooling the control part applicable to the live fish container according to the present invention, it may be apparent to one of ordinary skill in the art that the numbers and the spatial layout of the panel case 55 to be installed between the air supply tube 57 and the air exhaust tube 59 are not limited to the particular embodiment disclosed in the attached drawings. As such, those skilled in the art will appreciate that the numbers and the spatial layout of the panel case 55 can be adjusted in accordance with the number and the kind of the control means for the control part 50.

For example, one panel case 55 and one battery case 56 can be installed in the cargo room 3. The inverter 52 can be inserted into another case in which there is no battery 53. If the battery 53 is not used, the panel case 55 may be only used. The control panel 51, the inverter 52 and the battery 53 can be inserted into one case as needed. At this time, the connecting tube 58 is not applied thereto.

Since all of control means for the control part 50 are inserted into the sealing type case and an external air can be circulated through the interior of the case, it is possible to prevent moisture and salt components contained in the internal air of the cargo room 3 from contacting with the control means and it can effectively perform the cooling process of the control part 50 due to the circulation of the external air.

While the invention has been described with reference to a preferred embodiment, it will be understood by those skilled in the art that various changes may be made and equivalents may be substituted for elements thereof without departing from the scope of the invention. Therefore, it is intended that the invention not be limited to the particular embodiment disclosed as the best mode contemplated for carrying out this invention, but that the invention will include all embodiments falling within the scope of the appended claims.

INDUSTRIAL APPLICABILITY

The present invention relates to a container for transporting live fish, in which a protein skimmer is installed together with a fish tank in an interior of a cargo room of the container, a water cooler having a refrigerating unit is installed in a container driver unit such that water discharged from the fish tank is cooled and resupplied to the fish tank, or water cooled by the water cooler can be brought into contact with the external air while the water is being injected into a dry filtering tank installed on the fish tank, such that the live fish stored in the fish tank can be kept fresh over a long period of time for transportation, and the time period of transporting live fish and the distance able to be covered by the live fish transporting container can be extended to the maximum.

What is claimed is:

1. A live fish container including a cargo room of the type in which a driver unit is installed at a rear side of the cargo room in such a manner that it is integrally formed with a container main body or separately assembled with the container main body, a control part, a plurality of live fish water tanks and a plurality of wet-type filtering tanks, which are installed in the cargo room, and a water cooling apparatus installed at the driver unit as a refrigerating unit, which includes a compressor, a condenser and an expansion valve, wherein the improvement comprises:

a protein skimmer and a bubble tank installed in an interior of the cargo room, a water cooler for cooling live fish water by virtue of heat exchange with refrigerants, the water cooler being installed in the driver unit, and an air blower for introducing external air, the air blower being installed in the driver unit;

a water exhaust tube extending from the live fish water tanks, the water exhaust tube being fluid-communicated with the protein skimmer, and a water supply tube extending from the protein skimmer, the water supply tube being fluid-communicated with the live fish water tanks, in which a pump is disposed at a middle portion of the water exhaust tube;

a bubble outlet formed at an upper end of the protein skimmer and fluid-communicated with the bubble tank via a guide channel, a nozzle formed at the water exhaust tube at a position between the protein skimmer and the pump, in which an air supply tube is fluid-communicated with the nozzle;

the water cooler formed as a double tube-type heat exchanger such that a water cooling tube is longitudinally inserted into a refrigerant tube, in which the water cooling tube is fluid-communicated with a water exhaust tube having a circulation pump and extending from wet-type filtering tanks, and a water supply tube extending from the water cooling tube is fluid-communicated with the live fish water tanks in the cargo room;

an air supply tube installed in the interior of the cargo room such that one end thereof being fluid-communicated with the air blower of the driver unit; and an exhaust pipe formed through a main door or a wall (W) of the container main body.

2. The live fish container as claimed in claim 1, wherein a dry filtering tank is installed at a one upper side in an interior of the live fish water tank within the cargo room, and it comprises a filtering cover and a plurality of dry filtering members inserted between the filtering cover and the walls of the container main body;

the water supply tube extending from the water cooler to the interior of the cargo room is fluid-communicated with a water injection tube having a plurality of water injection nozzles, in which the water injection tube is installed above the level of the dry filtering members and extends along the longitudinal direction of the dry filtering members; and the air supply tube includes a plurality of air holes which are formed at regular intervals in the longitudinal direction thereof, and the air supply tube is installed above the level of the dry filtering members and runs parallel to the water injection tube.

3. The live fish container as claimed in claim 2, wherein the dry filtering member comprises a porous pellet filter disposed at an inner lower side of the filtering tank cover and porous fiber filters disposed above the level of the pellet filter within the filtering tank cover, in which the fiber filter and the pellet filters are impregnated with microorganisms that have been cultured therein so as to purify live fish water.

4. The live fish container as claimed in claim 3, wherein one end of a pressure tube extending from the wet-type filtering tanks is fluid-communicated with the other end of the water injection tube, in which a pressure pump is disposed at a middle portion of the pressure tube between the wet-type filtering tanks and the water injection tube.

5. The live fish container as in any one of claims 2 to 4, wherein a drain is formed at a lower side of the filtering tank cover of the dry filtering tank, a plurality of water flowing holes for introducing live fish water after passing through the dry filter member into the live fish water tanks are formed at one upper side surface of the live fish water tanks at regular intervals.

6. The live fish container as in any one of claims 1 to 4, wherein the wet-type filtering tanks are installed at the outside of the live fish water tanks, a working space for loading and unloading live fish is provided at a position adjacent to the live fish water tanks, an auxiliary door for allowing a worker to enter is installed at the wall (W) of the container main body at a position adjacent to the working space, and a drain pipe extends from the lower end of the live fish water tank at a bottom side of the working space, in which a drain valve is installed at a middle portion of the drain pipe.

7. The live fish container as claimed in claim 6, wherein an auxiliary circulation pump is installed at a bottom surface of the live fish container at a position in the working space, an auxiliary circulation pipe for circulating live fish water from the wet-type filtering tanks toward the interior of the live fish water tanks is fluid-communicated with the auxiliary circulation pump, a nozzle is formed at a middle portion of the auxiliary circulation pipe extending from the auxiliary circulation pump toward the live fish water tanks, and an air supply tube 45 is fluid-communicated with the nozzle.

8. The live fish container as in any one of claims 1 to 4, wherein the control part comprises a plurality of control panels, an inverter and a battery, in which electronic control means of the control panel are inserted into an enclosed type panel case, the inverter and the battery are inserted into an enclosed type battery case, wherein an air supply pipe extends from the main door or the wall (W) of the container main body to the control panel, an air discharge pipe extends from one of the control panel to the main door or the wall (W) of the container main body, and a plurality of connecting tubes extend between the panel cases and the battery case or between the panel cases, whereby it provides a circulation passage for external air, and wherein an air blower is installed at the air supply pipe, the air discharge pipe or an interior of the panel case.

9. The live fish container as claimed in claim 8, wherein the air supply pipe, the air discharge pipe and the connecting tubes extend between corners of the panel cases and the battery case so as to create an air stream to flow in a diagonal direction at interiors of the panel cases and the battery case.

* * * * *